United States Patent
Park et al.

(10) Patent No.: US 11,991,680 B2
(45) Date of Patent: May 21, 2024

(54) METHOD AND DEVICE FOR ALLOCATING RESOURCES BY LIMITING RU AND MRU FOR STA OPERATING ONLY IN 20MHZ BAND IN WLAN SYSTEM

(71) Applicant: LG ELECTRONICS INC., Seoul (KR)

(72) Inventors: Eunsung Park, Seoul (KR); Jinyoung Chun, Seoul (KR); Jinsoo Choi, Seoul (KR); Dongguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/387,273

(22) Filed: Nov. 6, 2023

(65) Prior Publication Data

US 2024/0073878 A1  Feb. 29, 2024

Related U.S. Application Data

(63) Continuation of application No. 18/134,387, filed on Apr. 13, 2023, now Pat. No. 11,838,902, which is a continuation of application No. 17/446,267, filed on Aug. 27, 2021, now Pat. No. 11,805,503.

(30) Foreign Application Priority Data

Sep. 3, 2020  (KR) .................. 10-2020-0112516
Sep. 7, 2020  (KR) .................. 10-2020-0114041

(51) Int. Cl.
*H04L 12/28*  (2006.01)
*H04W 72/0453*  (2023.01)
*H04W 84/12*  (2009.01)

(52) U.S. Cl.
CPC ........ *H04W 72/0453* (2013.01); *H04W 84/12* (2013.01)

(58) Field of Classification Search
CPC ............. H04L 5/0044; H04L 27/2603; H04W 72/0453; H04W 84/12
USPC ........................................ 370/252, 329, 430
See application file for complete search history.

(56) References Cited

U.S. PATENT DOCUMENTS

2022/0053465 A1* 2/2022 Redlich ................. H04L 5/0005
2022/0345276 A1* 10/2022 Redlich ................. H04W 72/23

* cited by examiner

*Primary Examiner* — John Pezzlo
(74) *Attorney, Agent, or Firm* — LEE, HONG, DEGERMAN, KANG & WAIMEY

(57) ABSTRACT

Proposed herein is a method and device for setting limited RUs and MRUs in a WLAN system. More specifically, a receiving STA receives a PPDU from a transmitting STA through a preset frequency band, and decodes the PPDU. The receiving STA is an STA operating only in a 20 MHz band. The PPDU includes a preamble and a data field. The data field is received through resources other than the first RU and the first MRU among the preset frequency band.

19 Claims, 21 Drawing Sheets

(a)

(b)

METHOD AND DEVICE FOR ALLOCATING RESOURCES BY LIMITING RU AND MRU FOR STA OPERATING ONLY IN 20MHZ BAND IN WLAN SYSTEM

CROSS-REFERENCE TO RELATED APPLICATIONS

This application is a continuation of U.S. patent application Ser. No. 18/134,387, filed on Apr. 13, 2023, which is a continuation of U.S. patent application Ser. No. 17/446,267, filed on Aug. 27, 2021, now U.S. Pat. No. 11,805,503, which claims the benefit of earlier filing date and right of priority to Korean Patent Application Nos. 10-2020-0112516, filed on Sep. 3, 2020 and 10-2020-0114041, filed on Sep. 7, 2020, the contents of which are all hereby incorporated by reference herein in their entirety.

TECHNICAL FIELD

The present specification relates to a method for performing allocation by limiting resources in a WLAN system and, most particularly, to a method and device for allocating resources by limiting RU and MRU for a station (STA) operating only in a 20 MHz band in a WLAN system.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In the new wireless LAN standard, an increased number of spatial streams may be used. In this case, in order to properly use the increased number of spatial streams, a signaling technique in the WLAN system may need to be improved.

SUMMARY OF THE DISCLOSURE

The present specification proposes a method and device for allocating resources by limiting RU and MRU for an STA operating only in a 20 MHz band in a wireless local area network (WLAN) system.

An example of the present specification proposes a method for allocating resources by limiting RU and MRU for an STA operating only in a 20 MHz band.

The present embodiment may be performed in a network environment in which a next generation WLAN system is being supported. The next generation wireless LAN system is a WLAN system that is enhanced from an 802.1 lax system and may, therefore, satisfy backward compatibility with the 802.11ax system.

The present embodiment may be performed by a receiving station (STA), and the receiving STA may correspond to a non-AP STA operating only in a 20 MHz band. A transmitting STA may correspond to an access point (AP) STA.

The present embodiment proposes a method for configuring RU and MRU that cannot be allocated (that are limited (or restricted) for allocation) to an STA operating only in a 20 MHz band based on an 80 MHz band tone plan, which is newly defined in an 802.11 be WLAN system.

A receiving station (STA) receives a Physical Protocol Data Unit (PPDU) from a transmitting STA through a preset frequency band.

The receiving STA decodes the PPDU.

The receiving STA is an STA that operates only in a 20 MHz band.

The PPDU includes a preamble and a data field. And, the data field is received through resources other than a first resource unit (RU) and a first multiple RUs (MRU) among the preset frequency band. The first MRU is newly defined in the 802.11be wireless LAN system as multiple RUs having 2 RUs aggregated therein.

When the preset frequency band is a 40 MHz band, an RU layout (or tone plan) for the 40 MHz band is as described below. The tone plan for the 40 MHz band is the same in both 802.1 lax and 802.11be WLAN systems.

When the 40 MHz band consists of only 26 tone RUs, the 40 MHz band includes first to 18th 26 tone RUs. When the 40 MHz band consists of only 52 tone RUs, the 40 MHz band includes first to 8th 52 tone RUs. When the 40 MHz band consists of only 106 tone RUs, the 40 MHz band includes first to 4th 106 tone RUs. And, when the 40 MHz band consists only of 242 tone RUs, the 40 MHz band includes first and second 242 tone RUs.

At this point, the first to 18th 26 tone RUs may be arranged by an order starting from a 26 tone RU having a low frequency to a 26 tone RU having a high frequency. The first to 8th 52 tone RUs may be arranged by an order starting from a 52 tone RU having a low frequency to a 52 tone RU having a high frequency. The first to 4th 106 tone RUs may be arranged by an order starting from a 106 tone RU having a low frequency to a 106 tone RU having a high frequency. And, the first and second 242 tone RUs may be arranged by an order starting from a 242 tone RU having a low frequency to a 242 tone RU having a high frequency.

The first RU includes the 5th and 14th 26 tone RUs and the first and second 242 tone RUs. That is, the 5th and 14th 26 tone RUs and the first and second 242 tone RUs correspond to resources that are not allocated to the receiving STA.

The first MRU includes an MRU in which the 5th 26 tone RU and the second 52 tone RU are aggregated, an MRU in which the 14th 26 tone RU and the 6th 52 tone RU are aggregated, an MRU in which the 5th 26 tone RU and the first 106 tone RU are aggregated, an MRU in which the 5th 26 tone RU and the second 106 tone RU are aggregated, an MRU in which the 14th 26 tone RU and the 3rd 106 tone RU are aggregated, and an MRU in which the 14th 26 tone RU and the 4th 106 tone RU are aggregated. That is, the multiple RUs included in the first MRU also correspond to resources that are not allocated to the receiving STA.

The present embodiment proposes a method according to which the receiving STA is allocated only to remaining units (RUs) excluding the first RU and the first MRU, when the receiving STA receives an OFDMA PPDU through a 40 MHz band.

Advantageous Effects

According to the embodiment proposed in this specification, the present disclosure may have a new effect of being capable of preventing performance degradation and interference of an adjacent channel from occurring by preventing data from being loaded on tones corresponding to DC tones and guard tones in a 20 MHz band, where the receiving STA can be operated. Thus, the present disclosure may also have an effect of increasing the overall throughput of an STA operating only in a 20 MHz band.

DETAILED DESCRIPTION

Figure 1:
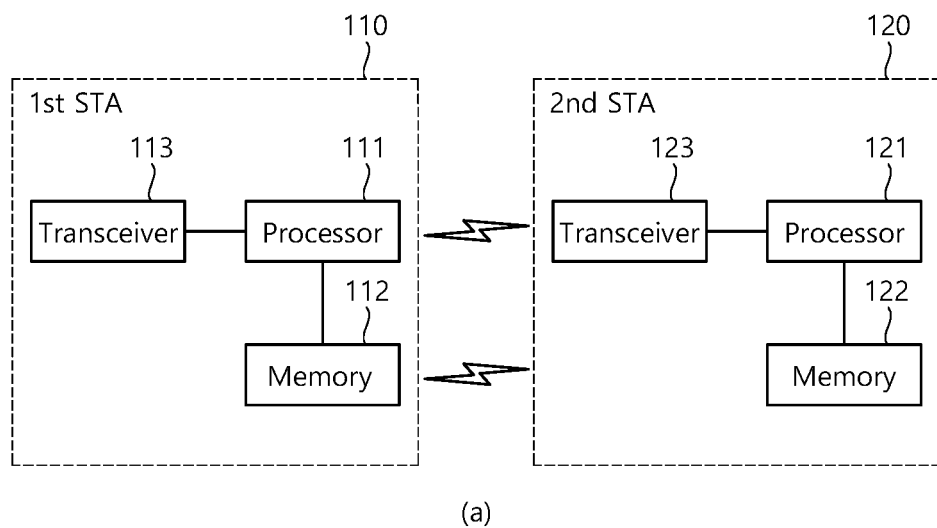
FIG. 1 illustrates an example of a transmitting device and/or a receiving device according to the present disclosure.
Figure 1:
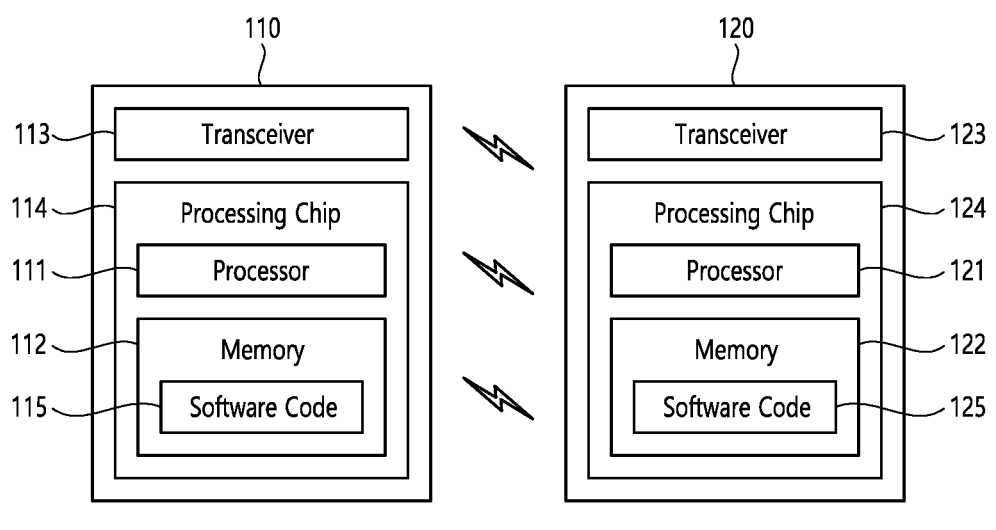

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as anon-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
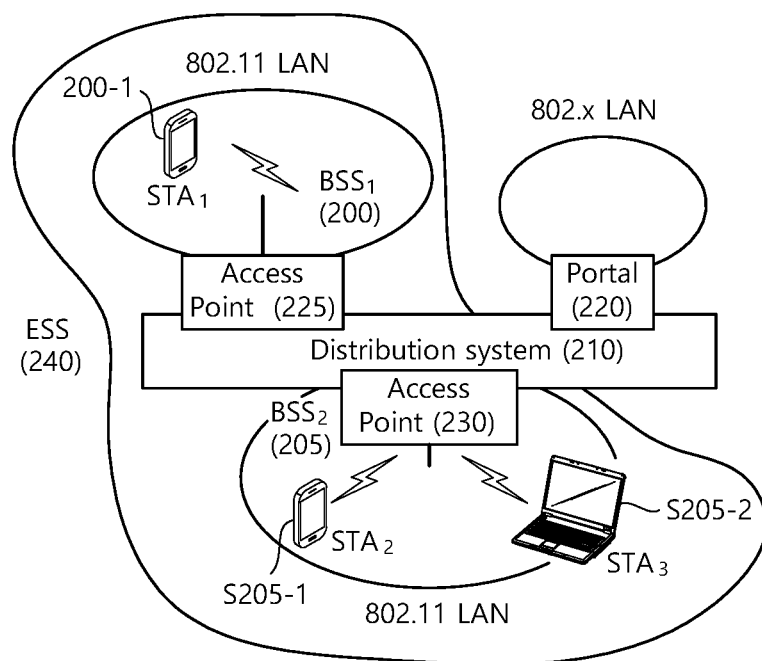
FIG. 2 is a conceptual diagram illustrating the structure of a wireless local area network (WLAN).
Figure 2:
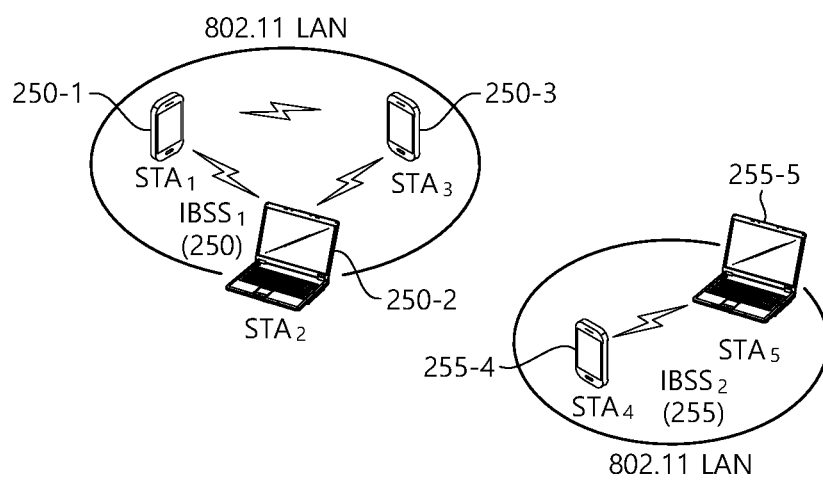

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
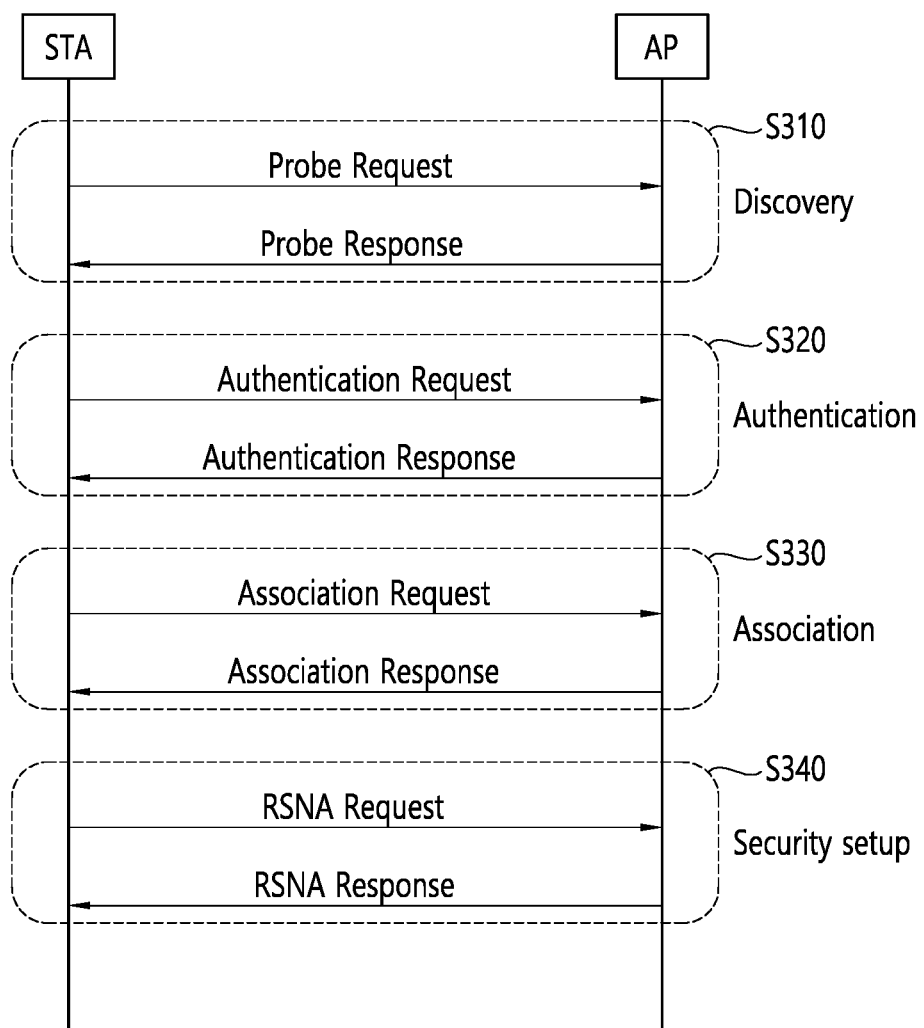
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
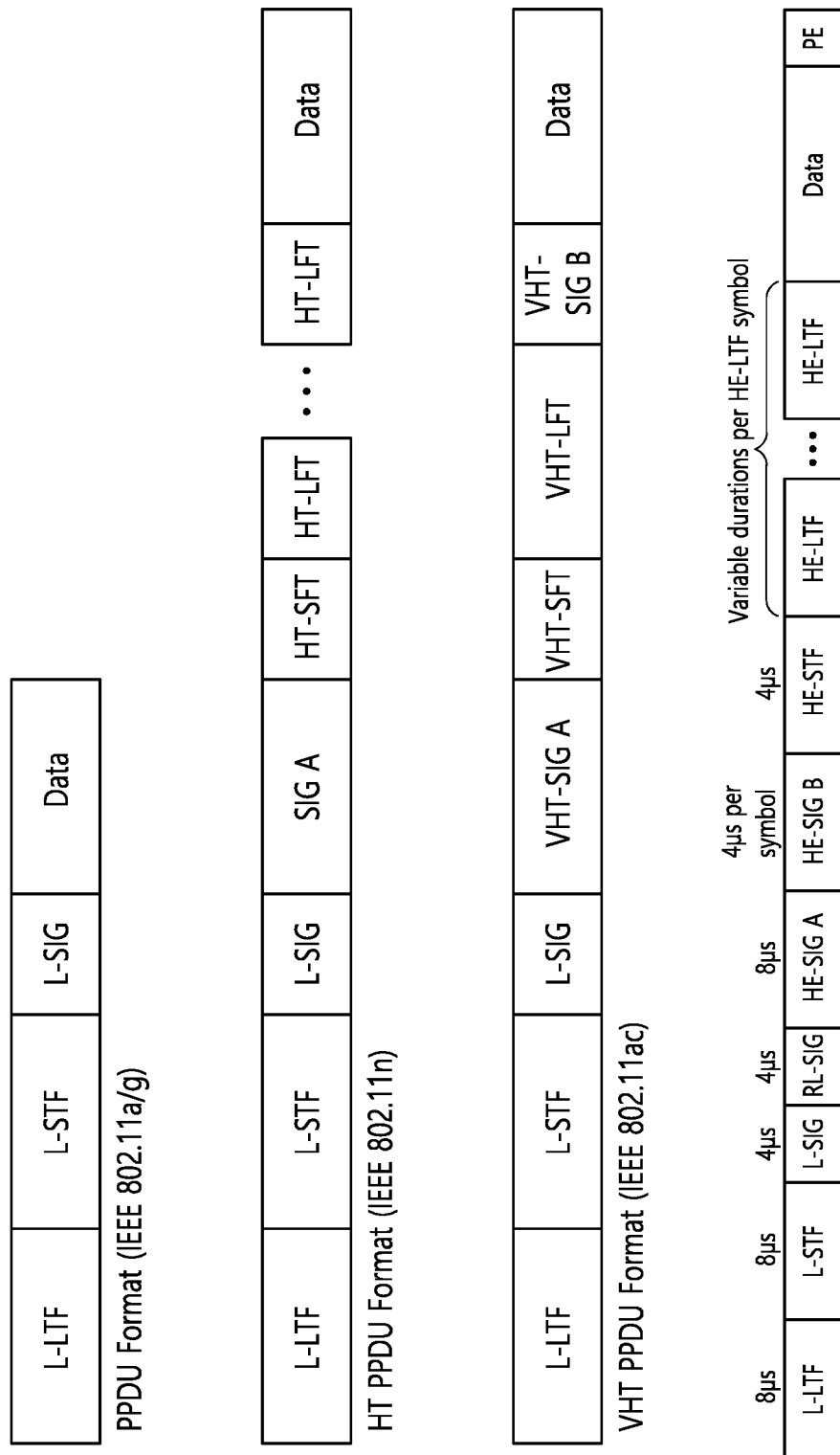
FIG. 4 illustrates an example of a PPDU used in an IEEE standard.

FIG. 4 illustrates an example of a PPDU used in an IEEE standard.

As illustrated in FIG. 4, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.1 lax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
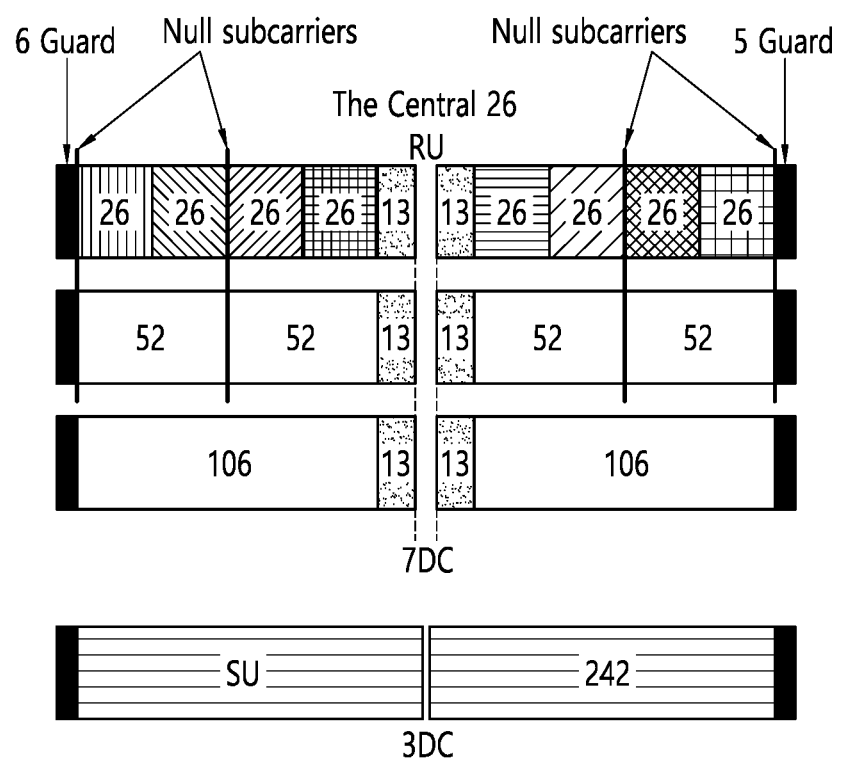
FIG. 5 is a diagram illustrating a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
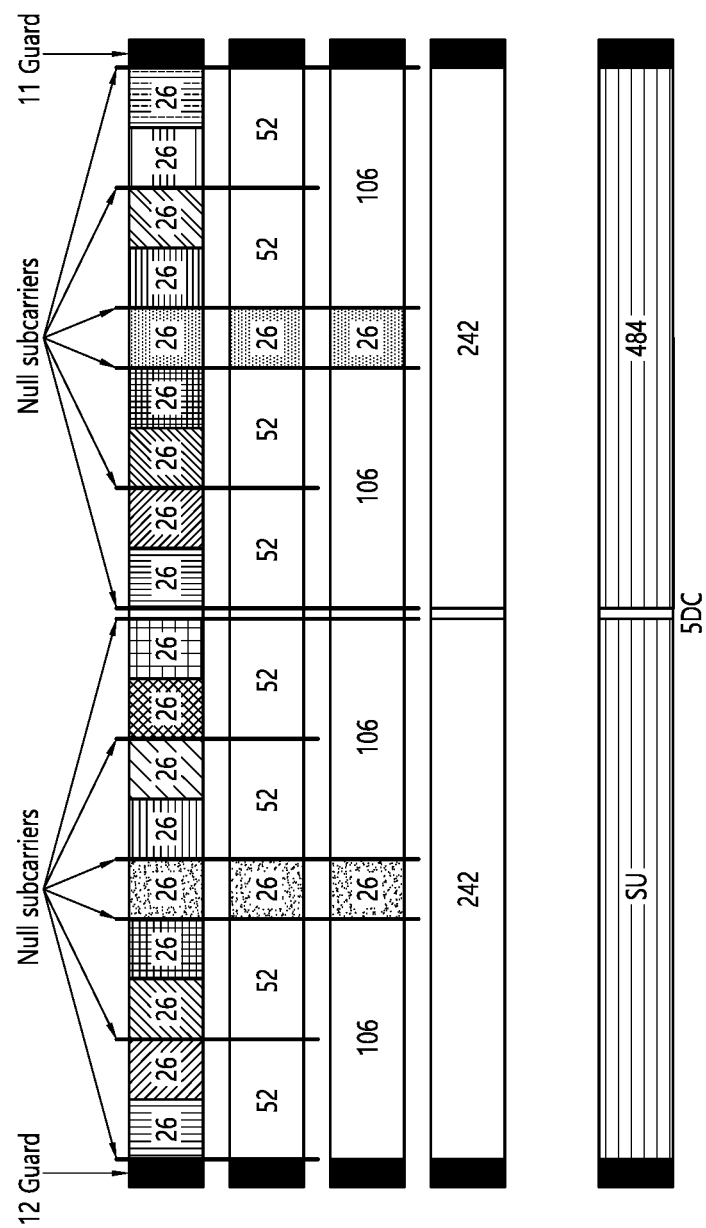
FIG. 6 is a diagram illustrating a layout of resource units (RUs) used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
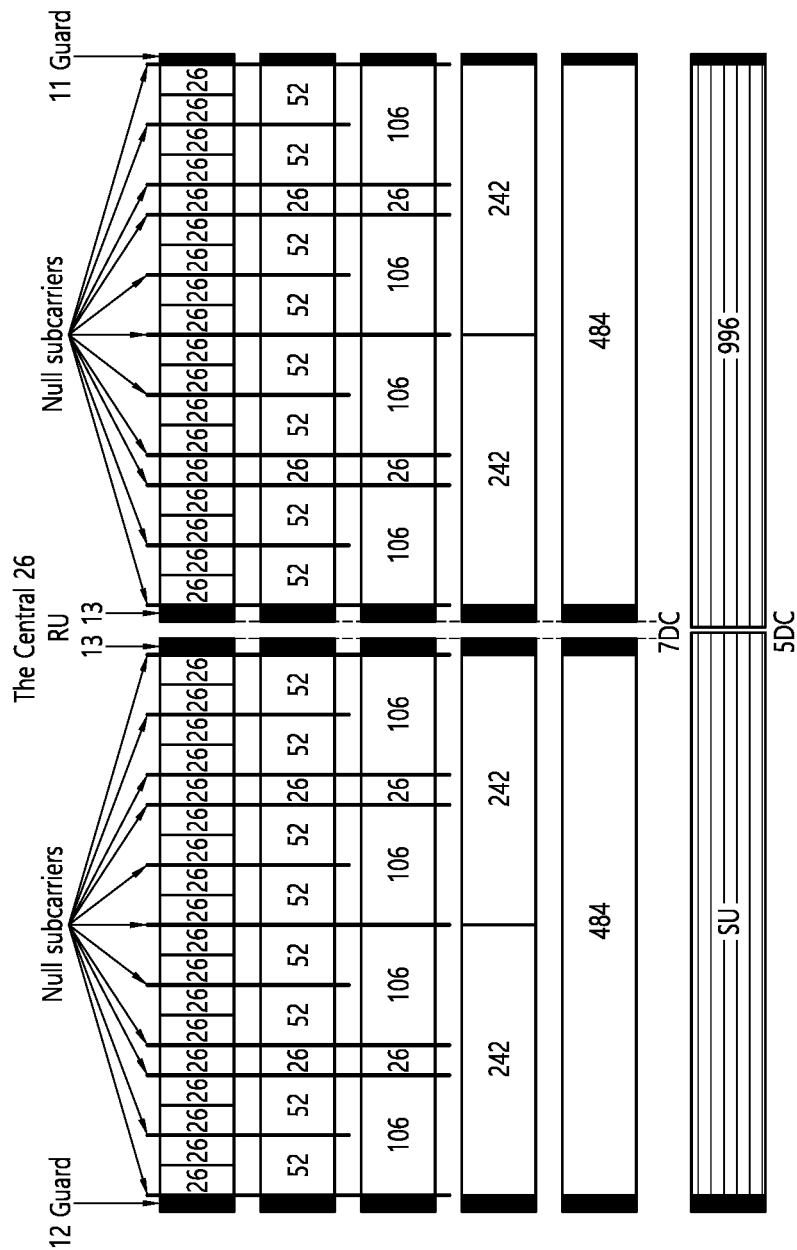
FIG. 7 is a diagram illustrating a layout of resource units (RUs) used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g., EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
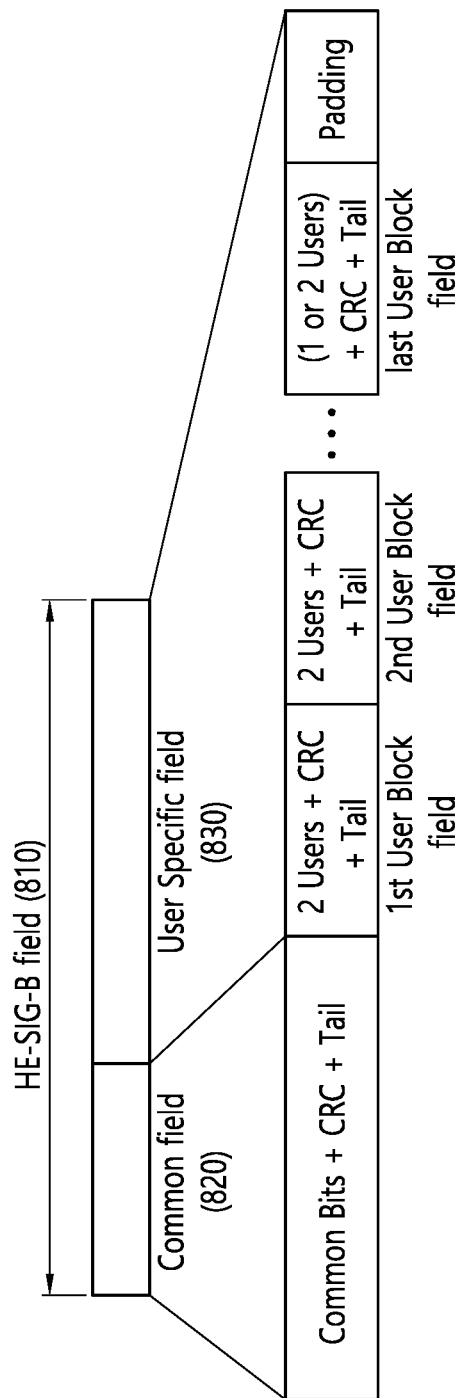
FIG. 8 illustrates the structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | | 52 | | 26 | 26 | 26 | 26 | 1 |
| 00000101 | 26 | 26 | | 52 | | 26 | 26 | 52 | | 1 |
| 00000110 | 26 | 26 | | 52 | | 26 | 52 | | 26 | 26 | 1 |
| 00000111 | 26 | 26 | | 52 | | 26 | 52 | | 52 | | 1 |
| 00001000 | | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
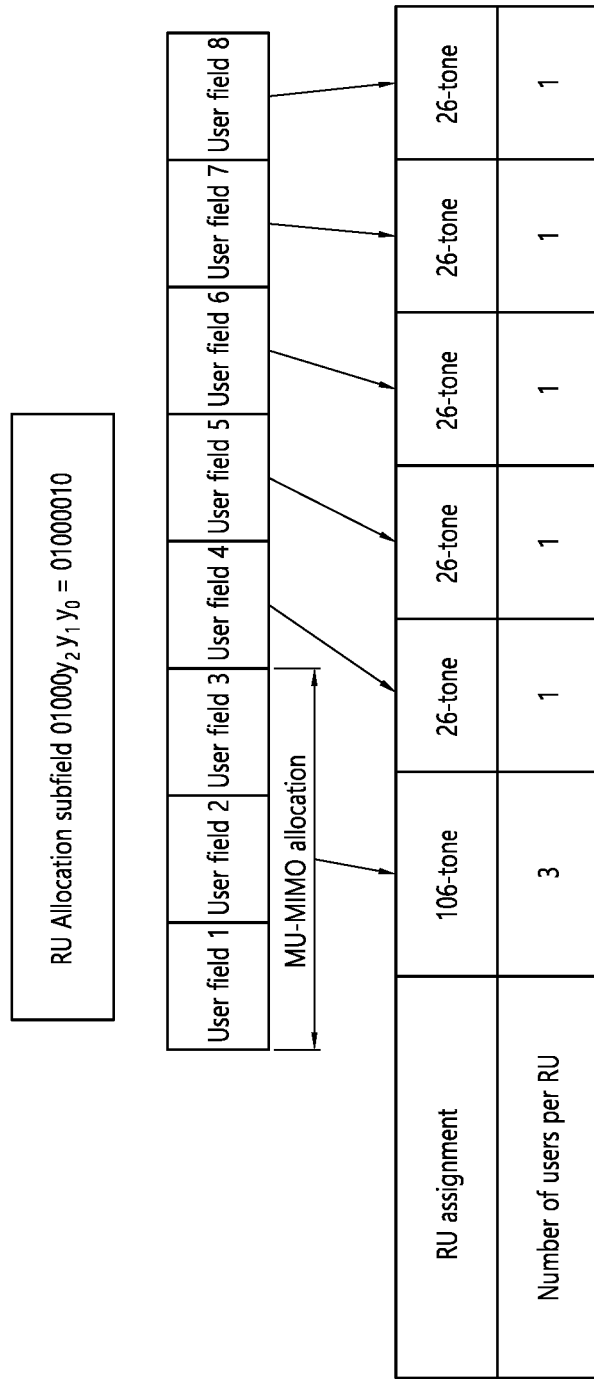
FIG. 9 illustrates an example in which a plurality of user STAs is allocated to the same RU through a MU-MIMO technique.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the format of the MU-MIMO scheme) may be configured as follows.

For example, a first bit (e.g., B0-B10) within the User field (i.e., 21 bits) may include identification information of a User STA (e.g., STA-ID, partial AID, and so on) to which the corresponding User field is allocated. Additionally, a second bit (e.g., B11-B14) within the User field (i.e., 21 bits) may include information related to spatial configuration.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Hereinafter, a PPDU transmitted/received in an STA of the present specification will be described.

Figure 10:
FIG. 10 illustrates an example of a PPDU used in the present disclosure.

FIG. 10 illustrates an example of a PPDU used in the present disclosure.

The PPDU of FIG. 10 may be referred to as various terms, such as EHT PPDU, transmitting PPDU, receiving PPDU, first type or Nth type PPDU, and so on. For example, in the present specification, PPDU or EHT PPDU may be referred to by using various terms, such as transmission PPDU, reception PPDU, first type or Nth type PPDU, and so on.

Additionally, the EHT PPDU may be used in an EHT system and/or a new WLAN system, which is an enhanced version of the EHT system.

The PPDU of FIG. 10 may represent part or all of a PPDU type that is used in an EHT system. For example, the example of FIG. 10 may be used for both single-user (SU) mode and multi-user (MU) mode. In other words, the PPDU of FIG. 10 may be a PPDU for one receiving STA or a PPDU for multiple receiving STAs. In case the PPDU of FIG. 10 is used for a Trigger-based (TB) mode, an EHT-SIG of FIG. 10 may be omitted. In other words, an STA that has received a Trigger frame for Uplink-MU (UL-MU) communication may transmit a PPDU, from which the EHT-SIG is omitted in the example of FIG. 10.

In FIG. 10, L-STF to EHT-LTF may be referred to as a preamble or physical preamble, and the L-STF to EHT-LTF may be generated/transmitted/received/obtained/decoded in a physical layer.

Subcarrier spacing of the L-LTF, L-STF, L-SIG, RL-SIG, U-SIG, and EHT-SIG fields of FIG. 10 may be determined as 312.5 kHz, and subcarrier spacing of the EHT-STF, EHT-LTF, Data fields may be determined as 78.125 kHz. That is, tone indexes (or subcarrier indexes) of the L-STF, L-LTF, L-SIG, RL-SIG, U-SIG, and EHT-SIG fields may be indicated in 312.5 kHz units, and tone indexes (or subcarrier indexes) of the EHT-STF, EHT-LTF, Data fields may be indicated in 78.125 kHz units.

In the PPDU of FIG. 10, L-LTF and L-STF may be the same as the fields of the prior art (or related art).

The L-SIG field of FIG. 10 may, for example, include 24 bits of bit information. For example, the 24-bit information may include a 4-bit Rate field, 1 Reserved bit, a 12-bit Length field, 1 Parity bit, and 6 Tail bits. For example, the 12-bit Length field may include information related to a PPDU length or time duration. For example, a value of the 12-bit Length field may be determined based on a type of the PPDU. For example, in case the PPDU is a non-HT PPDU, an HT PPDU, aVHT PPDU, or an EHT PPDU, the value of the Length field may be determined as a multiple of 3. For example, in case the PPDU is an HE PPDU, the value of the Length field may be determined as "a multiple of #+1" or "a multiple of #+2". In other words, a value of the Length field for a non-HT PPDU, an HT PPDU, a VHT PPDU, or an EHT PPDU may be determined as a multiple of 3, and a value of the Length field for an HE PPDU may be determined as "a multiple of 3+1" or "a multiple of #+2".

For example, a transmitting STA may apply BCC encoding, which is based on a ½-code rate for 24-bit information of the L-SIG field. Afterwards, the transmitting STA may obtain 48 bits of BCC encoding bits. Then, BPSK modulation may be applied to the 48 encoding bits so as to generate 48 BPSK symbols. The transmitting STA may map the 48 BPSK symbols to positions excluding a pilot subcarrier {Subcarrier indexes −21, −7, +7, +21} and a DC subcarrier {Subcarrier index 0}. As a result, the 48 BPSK symbols may be mapped to subcarrier indexes −26 to −22, −20 to −8, −6 to −1, +1 to +6, +8 to +20, and +22 to +26. The transmitting STA may additionally map a signal of {−1, −1, −1, 1} to subcarrier indexes {−28, −27, +27, +28}. The aforementioned signal may be used for channel estimation for a frequency domain corresponding to {−28, −27, +27, +28}.

The transmitting STA may generate an RL-SIG, which is generated identically as the L-SIG. The receiving STA may know that the reception PPDU is an HE PPDU or EHT PPDU based on the presence (or existence) of an RL-SIG.

A Universal SIG (U-SIG) may be inserted after the RL-SIG of FIG. 10. The U-SIG may also be referred to by using various terms, such as a first SIG field, a first SIG, a first-type SIG, a control signal, a control signal field, a first (type) control signal, and so on.

The U-SIG may include N-bit information and may also include information for identifying the EHT PPDU type. For example, the U-SIG may be configured based on 2 symbols (e.g., two contiguous OFDM symbols). Each symbol (e.g., OFDM symbol) for the U-SIG may have a duration of 4us. Each symbol of the U-SIG may be used for transmitting 26-bit information. For example, each symbol of the U-SIG may be transmitted/received based on 52 data tones and 4 pilot tones.

For example, A-bit information (e.g., 52 un-coded bits) may be transmitted through the U-SIG (or U-SIG field), and a first symbol of the U-SIG may transmit first X-bit information (e.g., 26 un-coded bits) among the total of A bits of the corresponding information, and a second symbol of the U-SIG may transmit remaining Y-bit information (e.g., 26 un-coded bits) of the A-bit information. For example, the transmitting STA may obtain 26 un-coded bits that are included in each U-SIG symbol. The transmitting STA may perform convolutional encoding (i.e., BCC encoding) based on a rate of R=½ so as to generate 52-coded bits, and, then, the transmitting STA may perform interleaving on the 52-coded bits. The transmitting STA may perform BPSK modulation on the interleaved 52-coded bits, so as to generate 52 BPSK symbols that are allocated to each U-SIG symbol. One U-SIG symbol may be transmitted based on 56 tones (subcarriers) starting from subcarrier index −28 to subcarrier index+28, with the exception for DC index 0. The 52 BPSK symbols that are generated by the transmitting STA may be transmitted based on the remaining tones (subcarriers) excluding the pilot tones −21, −7, +7, +21 tones.

For example, the A-bit information (e.g., 52 un-coded bits) may include a CRC field (e.g., 4-bit length field) and a Tail field (e.g., 6-bit length field). The CRC field and the Tail field may be transmitted through the second symbol of the U-SIG. The CRC field may be generated based on the 26 bits being allocated to the first symbol of the U-SIG and the remaining 16 bits excluding the CRC/Tail fields from the second symbol. And, the CRC field may be generated based on the related art CRC calculation algorithm. Additionally, the Tail field may be used for terminating a trellis of a convolutional decoder and may, for example, be configured as " ".

The A-bit information (e.g., 52 un-coded bits) being transmitted by the U-SIG (or U-SIG field) may be divided into version-independent bits and version-dependent bits. For example, a size of the version-independent bits may be fixed or variable. For example, the version-independent bits may be allocated only to the first symbol of the U-SIG or may be allocated to both the first and second symbols of the U-SIG. For example, the version-independent bits and the version-dependent bits may be referred to by using various terms, such as a first control bit and a second control bit.

For example, the version-independent bits of the U-SIG may include a 3-bit PHY version identifier. For example, the 3-bit PHY version identifier may include information related to the PHY version of the transmission/reception PPDU. For example, a first value of the 3-bit PHY version identifier may indicate that the transmission/reception PPDU is an EHT PPDU. In other words, when the transmitting STA transmits the EHT PPDU, the transmitting STA may configure the 3-bit PHY version identifier as the first value. In other words, based on the PHY version identifier having the first value, the receiving STA may determine that the reception PPDU is an EHT PPDU.

For example, the version-independent bits of the U-SIG may include a 1-bit UL/DL flag field. A first value of the 1-bit UL/DL flag field is related to UL communication, and a second value of the 1-bit UL/DL flag field is related to DL communication.

For example, the version-independent bits of the U-SIG may include information related to the length of a TXOP, and information related to BSS color ID.

For example, in case the EHT PPDU is divided into various types (e.g., EHT PPDU related to SU mode, EHT PPDU related to MU mode, EHT PPDU related to TB mode, EHT PPDU related to Extended Range transmission, and so on), information related to the EHT PPDU type may be included in the version-dependent bits of the U-SIG.

For example, the U-SIG may include information related to 1) a bandwidth field including information related to a bandwidth, 2) a field including information related to an MCS scheme being applied to the EHT-SIG, 3) an indication field including information related to whether or not a dual subcarrier modulation (DCM) scheme is applied to the EHT-SIG, 4) a field including information related to a number of symbols being used for the EHT-SIG, 5) a field including information related to whether or not the EHT-SIG is generated throughout the whole band, 6) a field including information related to an EHT-LTF/STF type, 7) a field indicating an EHT-LTF length and a CP length.

Preamble puncturing may be applied to the PPDU of FIG. 10. Preamble puncturing means applying puncturing to a partial band (e.g., a Secondary 20 MHz band) of the whole band of a PPDU. For example, when an 80 MHz PPDU is transmitted, the STA may apply puncturing to a secondary 20 MHz band of the 80 MHz band and may transmit the PPDU only through a primary 20 MHz band and a secondary 40 MHz band.

For example, a pattern of preamble puncturing may be preset (or predetermined). For example, when a first puncturing pattern is applied, the puncturing may be applied only for a secondary 20 MHz band within the 80 MHz band. For example, when a second puncturing pattern is applied, the puncturing may be applied to only one of the two secondary 20 MHz bands that are included in the secondary 40 MHz band within the 80 MHz band. For example, when a third puncturing pattern is applied, the puncturing may be applied only to a secondary 20 MHz band that is included in a primary 80 MHz band within a 160 MHz band (or 80+80 MHz band). For example, when a fourth puncturing pattern is applied, and when a primary 40 MHz band that is included in a primary 80 MHz band within a 160 MHz band (or 80+80 MHz band) is present, the puncturing may be applied to at least one 20 MHz channel that does not belong to the primary 40 MHz band.

Information related to the preamble puncturing that is applied to the PPDU may be included in the U-SIG and/or EHT-SIG. For example, a first field of the U-SIG may include information related to a contiguous bandwidth of the PPDU, and a second field of the U-SIG may include information related to preamble puncturing that is applied to the PPDU.

For example, the U-SIG and EHT-SIG may include information related to preamble puncturing based on the following method. When the bandwidth of a PPDU exceeds 80 MHz, the U-SIG may be separately configured in 80 MHz units. For example, when the bandwidth of a PPDU is 160 MHz, a first U-SIG for a first 80 MHz band and a second U-SIG for a second 80 MHz band may be included in the corresponding PPDU. In this case, a first field of the first U-SIG may include information related to the 160 MHz bandwidth, and a second field of the first U-SIG may include information related to preamble puncturing (i.e., information related to a preamble puncturing pattern) that is applied to the first 80 MHz band. Additionally, a first field of the second U-SIG may include information related to the 160 MHz bandwidth, and a second field of the second U-SIG may include information related to preamble puncturing (i.e., information related to a preamble puncturing pattern) that is applied to the second 80 MHz band. Meanwhile, an EHT-SIG that is contiguous to the first U-SIG may include information related to preamble puncturing (i.e., information related to a preamble puncturing pattern) that is applied to the second 80 MHz band, and an EHT-SIG that is contiguous to the second U-SIG may include information related to preamble puncturing (i.e., information related to a preamble puncturing pattern) that is applied to the first 80 MHz band.

Additionally or alternatively, the U-SIG and EHT-SIG may include information related to preamble puncturing based on the following method. The U-SIG may include information related to preamble puncturing (i.e., information related to a preamble puncturing pattern) for all bands. That is, the EHT-SIG may not include information related to preamble puncturing, and only the U-SIG may include information related to preamble puncturing (i.e., information related to a preamble puncturing pattern).

The U-SIG may be configured of 20 MHz units. For example, when an 80 MHz PPDU is configured, the U-SIG may be duplicated. That is, 4 identical U-SIGs may be included in the 80 MHz PPDU. A PPDU that exceeds the 80 MHz bandwidth may include different U-SIGs.

The EHT-SIG of FIG. 10 may include control information for the receiving STA. The EHT-SIG may be transmitted through at least one symbol, the one symbol may have a length of 4us. Information on a number of symbols that are used for the EHT-SIG may be included in the U-SIG.

The EHT-SIG may include technical features of the HE-SIG-B, which is described above with reference to FIG. 8 to FIG. 9. For example, just as in the example of FIG. 8, the EHT-SIG may include a common field and a user-specific field. The common field of the EHT-SIG may be omitted, and a number of user-specific fields may be determined based on a number of users.

Just as in the example of FIG. 8, the common field of the EHT-SIG and the user-specific field of the EHT-SIG may be separately (or individual) coded. Although one User block field that is included in the user-specific field may include information for two users, it may be possible for a last user block field that is included in the user-specific field to include information for one user. That is, one user block field of the EHT-SIG may include a maximum of two user fields. Just as in the example of FIG. 9, each user field may be related to MU-MIMO allocation or may be related to non-MU-MIMO allocation.

Just as in the example of FIG. 8, the common field of the EHT-SIG may include a CRC bit and a Tail bit. And, a length of the CRC bit may be determined to be equal to 4 bits, and a length of the Tail bit may be determined to be equal to 6 bits and may be set (or configured) as '000000'.

Just as in the example of FIG. 8, the common field of the EHT-SIG may include RU allocation information. The RU allocation information may mean information related to the location of an RU to which multiple users (i.e., multiple receiving STAs) are allocated. Just as shown in Table 1, the RU allocation information may be configured of 8-bit (or N-bit) units.

A mode having the common field of the EHT-SIG omitted may be supported. A mode wherein the common field of the EHT-SIG is omitted may be referred to as a compressed mode.

When the compressed mode is used, multiple users (i.e., multiple receiving STAs) of an EHT PPDU may decode the PPDU (i.e., a data field of the PPDU) based on non-OFDMA. That is, multiple users of an EHT PPDU may decode a PPDU (i.e., a data field of the PPDU) that is received through a same frequency band. Meanwhile, when a non-compressed mode is used, multiple users of an EHT PPDU may decode a PPDU (i.e., a data field of the PPDU) based on OFDMA. That is, multiple users of an EHT PPDU may receive a PPDU (i.e., a data field of the PPDU) through different frequency bands.

The EHT-SIG may be configured based on various MCS schemes. As described above, the information related to the MCS scheme being applied to the EHT-SIG may be included in the U-SIG. The EHT-SIG may be configured based on a DCM scheme. For example, among N number of data tones (e.g., 52 data tones) being allocated for the EHT-SIG, a first modulation scheme may be applied to one half of contiguous tones, and a second modulation scheme may be applied to the remaining half of contiguous tones. That is, the transmitting STA may modulate specific control information to a first symbol based on the first modulation scheme and may allocate the modulated first symbol to one half of contiguous tones. Thereafter, the transmitting STA may module the same control information to a second symbol based on the second modulation scheme and may allocated to modulated second symbol to the other half of contiguous tones. As described above, information related to whether or not the DCM scheme is applied to the EHT-SIG (e.g., 1 bit field) may be included in the U-SIG. EHT-STF of FIG. 10 may be used for enhancing automatic gain control estimation in a multiple input multiple output (MIMO) environment or OFDMA environment. And, EHT-LTF of FIG. 10 may be used for estimating a channel in a MIMO environment or OFDMA environment.

Information related to an STF and/or LTF type (including information related to GI that is applied to the LTF) may be included in an SIG A field and/or SIG B field of FIG. 10.

The PPDU (i.e., EHT-PPDU) of FIG. 10 may be configured based on examples of FIG. 5 and FIG. 6.

For example, an EHT PPDU being transmitted over a 20 MHz band, i.e., a 20 MHz EHT PPDU, may be configured based on RUs of FIG. 5. That is, the location of an RU of the EHT-STF, EHT-LTF, data field being included in the EHT PPDU may be determined as shown in FIG. 5.

An EHT PPDU being transmitted over a 40 MHz band, i.e., a 40 MHz EHT PPDU, may be configured based on RUs of FIG. 6. That is, the location of an RU of the EHT-STF, EHT-LTF, data field being included in the EHT PPDU may be determined as shown in FIG. 6.

Since the RU location of FIG. 6 corresponds to 40 MHz, if the pattern of FIG. 6 is repeated two times, a tone plan for 80 MHz may be determined. That is, an 80 MHz EHT PPDU may be transmitted based on a new tone plan in which the RU of FIG. 6 is repeated two times, and not the RU of FIG. 7.

In case the pattern of FIG. 6 is repeated two times, 23 tones (i.e., 11 guard tones+12 guard tones) may be configured in a DC region. That is, a tone plan for an 80 MHz EHT PPDU being allocated based on OFDMA may have 23 DC tones. On the other hand, an 80 MHz EHT PPDU being allocated based on non-OFDMA (i.e., non-OFDMA full Bandwidth 80 MHz PPDU) may be configured based on 996 RUs and may include 5 DC tones, 12 left-guard tones, and 11 right-guard tones.

A tone plan for 160/240/320 MHz may be configured to have a format of repeating the pattern of FIG. 6 multiple times.

The PPDU of FIG. 10 may be identified as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 10. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; and 3) L-SIG including a length field in which a result of applying "modulo 3" is set to "0".

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT and VHT PPDU: 1) when a first symbol after an L-LTF signal is a BPSK symbol; and 2) when RL-SIG in which the L-SIG is repeated is not detected. In addition, the RX PPDU may be determined as the non-HT, HT and VHT PPDU when a result of applying "modulo 3" to a value of a length field of the L-SIG is detected as "0" even if the receiving STA detects the repetition of RL-SIG.

In the following example, a signal represented by a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive various types of frames. For example, the PPDU of FIG. 10 may be used for a control frame. An example of the control frame may include a request to send (RTS), a clear to send (CTS), a power save (PS)-poll, a BlockACKReq, a BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two of the control frame, the management frame, and the data frame.

Figure 11:
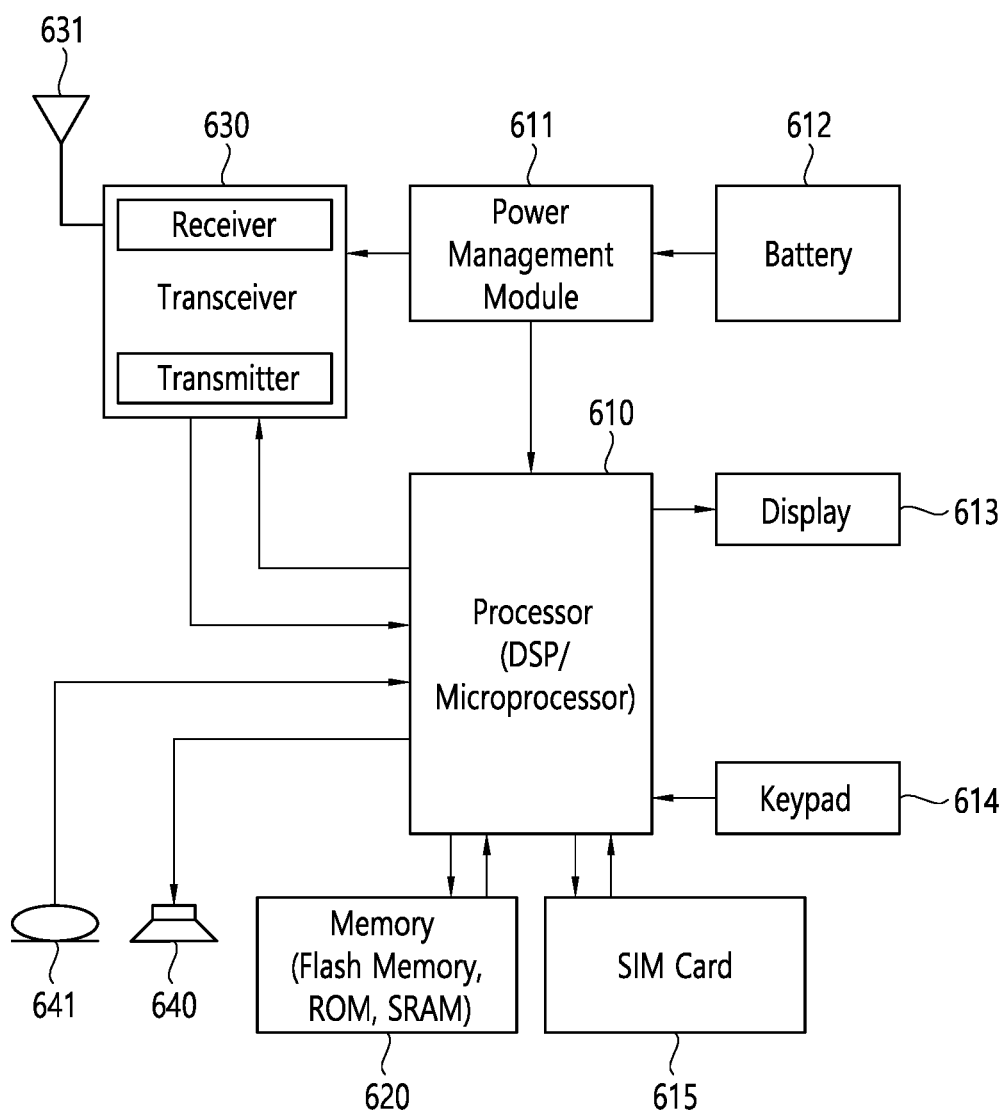
FIG. 11 illustrates modified examples of a transmitting device and/or receiving device of the present specification.

FIG. 11 illustrates modified examples of a transmitting device and/or receiving device of the present specification.

Each device/STA shown in sub-figures (a)/(b) of FIG. 1 may be modified as shown in FIG. 11. A transceiver 630 of FIG. 11 may be the same as the transceiver(s) 113 and 123 of FIG. 1. The transceiver 630 of FIG. 11 may include a receiver and a transmitter.

A processor 610 of FIG. 11 may be the same as the processor(s) 111 and 121 shown in FIG. 1. Alternatively, the processor 610 of FIG. 11 may be the same as the processing chip(s) 114 and 124 shown in FIG. 1.

A memory 150 of FIG. 11 may be the same as the memory(s) 112 and 122 shown in FIG. 1. Alternatively, the memory 150 of FIG. 11 may be a separate external memory that is different from the memory(s) 112 and 122 shown in FIG. 1.

Referring to FIG. 11, the power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 may be an integrated circuit that is intended to securely store the international mobile subscriber identity (IMSI) number and its related key, which are used to identify and authenticate subscribers on mobile telephony devices (such as mobile phones and computers).

Referring to FIG. 11, the speaker 640 may output sound-related results processed by the processor 610. The microphone 641 may receive sound-related inputs to be used by the processor 610.

i. Subcarrier and Resource Allocation for Wideband

A wideband that is described in the present specification represents a band having a bandwidth of 80 MHz or wider having a frequency lower than the DC tone. And, a subcarrier having a subcarrier index of a positive number corresponds to a subcarrier having a frequency higher than the DC tone. At this point, RU 5 is a middle 26 tone RU.

TABLE 3

| RU type | RU index and subcarrier range | | | | |
|---|---|---|---|---|---|
| 26-tone RU | RU 1 | RU 2 | RU 3 | RU 4 | RU 5 |
| | [−121 −96] | [−95: −70] | [−68: −43] | [−42: −17] | [−16: −4, 4: 16] |
| | RU 6 | RU 7 | RU 8 | RU 9 | |
| | [17: 42] | [43: 68] | [70.95] | [96: 121] | |
| 52-tone RU | RU 1 | RU 2 | RU 3 | RU 4 | |
| | [−121: −70] | [−68: −17] | [17: 68] | [70: 121] | |
| 106-tone RU | RU 1 | | RU 2 | | |
| | [−122: 17] | | [37: 122] | | |
| 242-tone RU | RU 1 | | | | |
| | [−122: −2, 2: 122] | | | | |

The subcarrier index of 0 corresponds to the DC tone. Negative subcartier indices correspond to subcarries with frequency lower than the DC tone, and positive subcarrier indices correspond to subcarriers with frequency higher than the DC tone RU 5 is the middle 26-tone RU.

Data and pilot subcarrier indexes of the RUs in 40 MHz HE/EHT PPDU are fixed as described below. In the following table, a subcarrier having a subcarrier index of 0 corresponds to a DC tone. A subcarrier having a subcarrier index of a negative number corresponds to a subcarrier having a frequency lower than the DC tone. And, a subcarrier having a subcarrier index of a positive number corresponds to a subcarrier having a frequency higher than the DC tone.

TABLE 4

| RU type | RU index and subcarrier range | | | | |
|---|---|---|---|---|---|
| 26-tone RU | RU 1 | RU 2 | RU 3 | RU 4 | RU 5 |
| | [−243: −218] | [−217: −192] | [−189: −164] | [−163: −138] | [−136: −111] |
| | RU 6 | RU 7 | RU 8 | RU 9 | |
| | [−109: −84] | [−83: −58] | [−55: −30] | [−29: −4] | |
| | RU 10 | RU 11 | RU 12 | RU 13 | RU 14 |
| | [4: 29] | [30: 55] | [58: 83] | [84: 109] | [111: 136] |
| | RU 15 | RU 16 | RU 17 | RU 18 | |
| | [138: 163] | [304: 189] | [192: 217] | [218: 243] | |
| 52-tone RU | RU 1 | RU 2 | RU 3 | RU 4 | |
| | [−243: −192] | [−189: −138] | [−109: −58] | [−55: −4] | |
| | RU 5 | RU 6 | RU 7 | RU 8 | |
| | [4: 55] | [58: 109] | [138: 189] | [192: 243] | |
| 106-tone RU | RU 1 | RU 2 | RU 3 | RU 4 | |
| | [−243: −138] | [−109: −4] | [4: 109] | [138: 243] | |
| 242-tone RU | RU 1 | | RU 2 | | |
| | [−244: −3] | | [3: 244] | | |
| 484-tone RU | RU 1 | | | | |
| | [−244: −3, 3: 244] | | | | |

(80 MHz, 160 MHz, and 320 MHz). Tone plans (or resource unit (RU) layouts) being used in 20 MHz and 40 MHz bands are the same in 802.11ax and 802.11be (the RU layouts of FIG. 5 and FIG. 6 are used without modification).

Data and pilot subcarrier indexes of the RUs in 20 MHz HE/EHT PPDU are fixed as described below. In the following table, a subcarrier having a subcarrier index of 0 corresponds to a DC tone. A subcarrier having a subcarrier index of a negative number corresponds to a subcarrier However, for a wideband, since a tone plan of 802.11be and a tone plan of 802.11ax are defined differently, the tone plan for a 80 MHz band will be described as follows.

Figure 12:
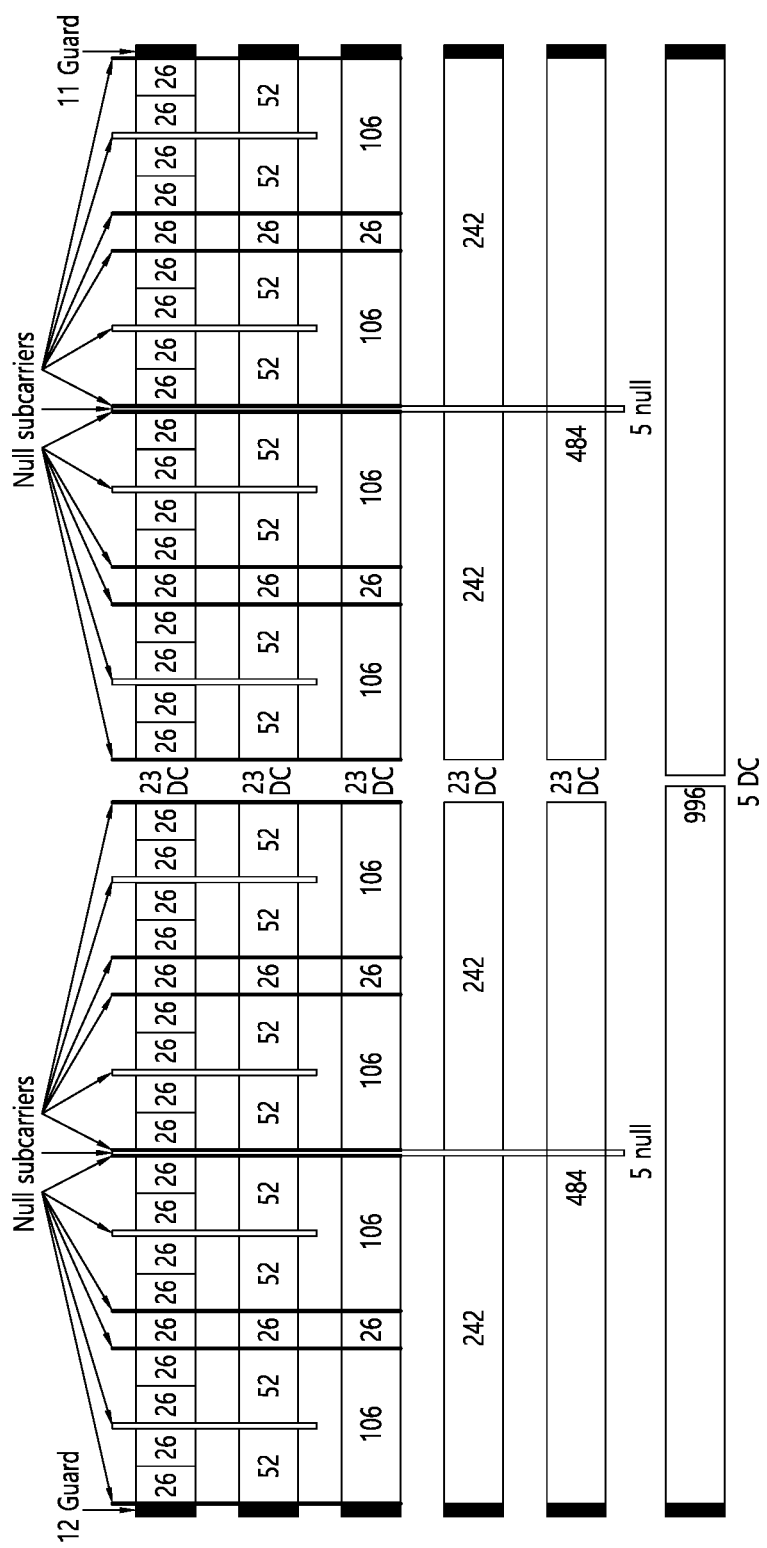
FIG. 12 illustrates atone plan for an 80 MHz PPDU in an 802.11be WLAN system.

FIG. 12 illustrates a tone plan for an 80 MHz PPDU in an 802.11be WLAN system.

Tone plans and RU locations for 20 MHz and 40 MHz PPDUs in the 802.11be WLAN system are the same as those in the 802.11 ax WLAN system. FIG. 12 shows an EHT tone plan and RU locations for an 80 MHz PPDU. An EHT PPDU being extended to a 160 MHz band or wider is configured of multiple 80 MHz sub-blocks. The tone plan for each 80 MHz sub-block is the same as the tone plan for the 80 MHz EHT PPDU. When an 80 MHz sub-block is not punctured and a full (or whole) 80 MHz sub-block is used as an RU or part of an RU or MRU within an 80/160/320 MHz PPDU, the 80 MHz sub-block uses 996 tone RUs, as shown in FIG. 12. When an 80 MHz sub-block is punctured, or when a full (or whole) 80 MHz sub-block is not used as an RU or part of an RU or MRU within the 80/160/320 MHz PPDU, the 80 MHz sub-block uses a tone plan excluding 996 tone RUs, as shown in FIG. 12.

Data and pilot subcarrier indexes of the RUs in an 80 MHz EHT PPDU are fixed as described below. In the following table, a subcarrier having a subcarrier index of 0 corresponds to a DC tone. A subcarrier having a subcarrier index of a negative number corresponds to a subcarrier having a frequency lower than the DC tone. And, a subcarrier having a subcarrier index of a positive number corresponds to a subcarrier having a frequency higher than the DC tone. Additionally, in 802.11be, since the middle 26 tone RU is not defined in the tone plan for the 80 MHz band, RU 19 is indicated as "not defined".

Furthermore, in 802.11be, Multiple RUs (MRU(s)) may be allocated to the EHT STA, and subcarrier indexes of the MRU may be configured of the RU indexes shown in Table 5.

2. Non-AP STA operating in 20 MHz

A non-AP EHT STA operating in 20 MHz is a non-AP EHT STA having its current operating mode support a maximum channel width of 20 MHz. A supported channel width of the Non-AP EHT STA is indicated in a Supported Channel Width subfield of an HE PHY Capabilities Information field. In a 6 GHz subfield of an EHT Capabilities element, supported and operating channel width for 320 MHz may be updated along with a Channel Width subfield of the OM Control subfield, or a Channel Extension subfield of the EHT OM Control subfield and the OM Control subfield that is transmitted from the EHT STA, when an Operating Mode Notification frame, an Operating Mode Notification element having an Rx NSS type subfield being equal to 0, or an EHT OM Control subfield do not exist in the same A-Control field.

A non-AP EHT STA operating in 20 MHz is a 20 MHz only non-AP EHT STA, or a non-AP EHT STA that can

TABLE 5

| RU type | RU index and subcarrier range | | | | |
|---|---|---|---|---|---|
| 26-tone RU | RU 1 [−499: −474] | RU 2 [−473: −448] | RU 3 [−445: −420] | RU 4 [−419: −394] | RU 5 [−392: −367] |
| | RU 6 [−365: −340] | RU 7 [−339: −314] | RU 8 [−311: −286] | RU 9 [−285: −260] | |
| | RU 10 [−252: 227] | RU 11 [−226: −201] | RU 12 [−198: −173] | RU 13 [−172: −147] | RU 14 [−145: −120] |
| | RU 15 [−118: −93] | RU 16 [−92: −67] | RU 17 [−64: −39] | RU 18 [−38: −13] | RU 19 [not defined] |
| | RU 20 [13: 38] | RU 21 [39: 64] | RU 22 [67: 92] | RU 23 [93: 118] | RU 24 [120: 145] |
| | RU 25 [147: 172] | RU 26 [173: 198] | RU 27 [201: 226] | RU 28 [227: 252] | |
| | RU 29 [260: 285] | RU 30 [286: 311] | RU 31 [314: 339] | RU 32 [340: 365] | RU 33 [367: 392] |
| | RU 34 [394: 419] | RU 35 [420: 445] | RU 36 [448: 473] | RU 37 [474: 499] | |
| 52-tone RU | RU 1 [−499: −448] | RU 2 [−445: −394] | RU 3 [−365: −314] | RU 4 [−311: −260] | |
| | RU 5 [−252: −201] | RU 6 [−198: −147] | RU 7 [−118: −67] | RU 8 [−64: −13] | |
| | RU 9 [13: 64] | RU 10 [67: 118] | RU 11 [147: 198] | RU 12 [201: 252] | |
| | RU 13 [260: 311] | RU 14 [314: 365] | RU 15 [394: 445] | RU 16 [448: 499] | |
| 106-tone RU | RU 1 [−499: −394] | RU 2 [−365: −260] | RU 3 [−252: −147] | RU 4 [−118: −13] | |
| | RU 5 [13: 118] | RU 6 [147: 252] | RU 7 [260: 365] | RU 8 [394: 499] | |
| 242-tone RU | RU 1 [−500: −259] | RU 2 [−253: −12] | RU 3 [12: 253] | RU 4 [259: 500] | |
| 484-tone RU | RU 1 [−500: −259, −253, −12] | RU 2 [12: 253, 289: 500] | | | |
| 996-tone RU | RU 1 [−500: −3, 3: 500] | | | | |

Additionally, in 802.11be, the tone plan for the 160 MHz band is configured of the tone plan of FIG. 12 being repeated two times. Herein, data and pilot subcarrier indexes of the RUs in the 160 MHz EHT PPDU may be fixed based on Table 5. And, in 802.11be, the tone plan for the 320 MHz band is configured of the tone plan of FIG. 12 being repeated four times. Herein, data and pilot subcarrier indexes of the RUs in the 320 MHz EHT PPDU may be fixed based on Table 5.

operate only in a 20 MHz channel width, such as a non-AP EHT STA reducing its operating channel width to 20 MHz.

A non-AP EHT STA operating in 20 MHz shall be capable of participating in 20 MHz, 40 MHz, 80 MHz or 160 MHz EHT DL and UL OFDMA transmission. A non-AP EHT STA operating in 20 MHz other than the 20 MHz only non-AP EHT STA shall also be capable of participating in a 320 MHz EHT DL and UL OFDMA transmission.

When participating in EHT DL and UL OFDMA transmission using a PPDU bandwidth of 20 MHz, the non-AP EHT STA operating in 20 MHz shall support 26 tone RUs, 52 tone RUs, 106 tone RUs, 242 tone RUs, 52+26 tone MRUs and 106+26 tone MRUs. The EHT AP shall be capable of allocating RUs or MRUs of a 20 MHz EHT MU PPDU or EHT TB PPDU to a non-AP EHT STA operating in 20 MHz.

When participating in EHT DL and UL OFDMA transmission using a PPDU bandwidth greater than 20 MHz and less than 320 MHz, the non-AP EHT STA operating in 20 MHz may support 26 tone RUs, 52 tone RUs, 106 tone RUs, 52+26 tone MRUs. When participating in EHT DL and UL OFDMA transmission using a PPDU bandwidth of 320 MHz, a non-AP EHT STA operating in 20 MHz other than the 20 MHz only non-AP EHT STA shall also support 26 tone RUs, 52 tone RUs, 106 tone RUs and 52+26 tone MRUs at the previously allowed locations. When participating in EHT DL transmission using a PPDU bandwidth of 320 MHz, a non-AP EHT STA operating in 20 MHz other than the 20 MHz only non-AP EHT STA may also support 242-tone RUs. An EHT AP having an operating channel width greater than 20 MHz may allocate RUs or MRUs in a 20 MHz channel within a BSS bandwidth in a 40 MHz, 80 MHz or 160 MHz EHT MU PPDU or EHT TB PPDU, to a non-AP EHT STA operating in 20 MHz, in accordance with an operating channel width of the AP. The operating channel of the AP is the same as the BSS channel width. An EHT AP having a 320 MHz operating channel width shall be capable of allocating RUs or MRUs of a 20 MHz channel within a BSS bandwidth of a 320 MHz EHT MU PPDU or EHT TB PPDU, to a non-AP EHT STA operating in 20 MHz other than the 20 MHz only non-AP EHT STA. When the EHT AP allocates RUs or MRUs to a non-AP EHT STA operating in 20 MHz, the EHT AP shall follow the restrictions (or limitations) on 20 MHz operation, which will be described later on.

The non-AP EHT STA operating in 20 MHz shall be capable of transmitting preamble and data from the RUs or MRUs that are allocated to the 20 MHz channel operating in the 20 MHz, 40 MHz, 80 MHz or 160 MHz EHT TB PPDU. A non-AP EHT STA operating in 20 MHz other than the 20 MHz only non-AP EHT STA shall also be capable of transmitting preamble and data from the RUs or MRUs that are allocated to the 20 MHz channel operating in the 320 MHz EHT TB PPDU. When the EHT AP allocates the RUs or MRUs to a non-AP EHT STA operating in 20 MHz, the EHT AP shall follow the restrictions (or limitations) on 20 MHz operation, which will be described later on.

The non-AP EHT STA operating in 20 MHz shall be capable of supporting preamble and data reception in the RUs or MRUs that are allocated to the 20 MHz channel operating in the 20 MHz, 40 MHz, 80 MHz or 160 MHz EHT MU PPDU. A non-AP EHT STA operating in 20 MHz other than the 20 MHz only non-AP EHT STA shall also be capable of supporting preamble and data reception in the RUs or MRUs that are allocated to the 20 MHz channel operating in the 320 MHz EHT MU PPDU. RU and MRU restrictions (or limitations) for 20 MHz operations will be described later on.

When the non-AP EHT STA operating in 20 MHz does not configure (or set) a Subchannel Selective Transmission (SST) operation in a non-primary 20 MHz channel along with the EHT AP, the EHT AP shall not allocate RUs or MRUs located outside of a primary 20 MHz in the 80 MHz, 160 MHz or 320 MHz EHT MU PPDU or EHT TB PPDU to the non-AP EHT STA operating in 20 MHz.

3. Embodiment(s) Applicable to the Present Specification

In order to increase a peak throughput, the 802.11be WLAN system is considering the transmission of increased streams by using a band that is wider than the legacy 802.1 lax, or by using a larger number of antennas. Moreover, the present specification is also considering a method of using various bands/links by performing aggregation.

Meanwhile, a 20 MHz only or operating non-AP STA may be used in a 2.4 GHz or 5 GHz band (herein, the corresponding non-AP STA may also be additionally used in a 6 GHz band). And, in this case, the 20 MHz only or operating non-AP STA may be allocated to RUs within a specific 20 MHz subchannel of a 20 MHz PPDU as well as a 40/80/160/320 MHz PPDU, thereby being capable of transmitting/receiving data. In such situation, the present specification proposes RUs in 20 MHz that cannot be allocated to the 20 MHz only or operating STA. Herein, a 20 MHz operating STA is a non-AP EHT STA operating in a 20 MHz channel width mode, which represents a case where the STA is the same as a 20 MHz only non-AP EHT STA or an EHT STA that reduces its operating channel width to 20 MHz by using Operating Mode Indication (OMI). The 20 MHz only STA corresponds to the 20 MHz only non-AP EHT STA, which means that the STA is a non-AP EHT STA that only supports a 20 MHz channel width for a frequency band in a Supported Channel Width Set subfield, which is included in an HE PHY Capabilities Information field of the HE Capabilities element.

Figure 13:
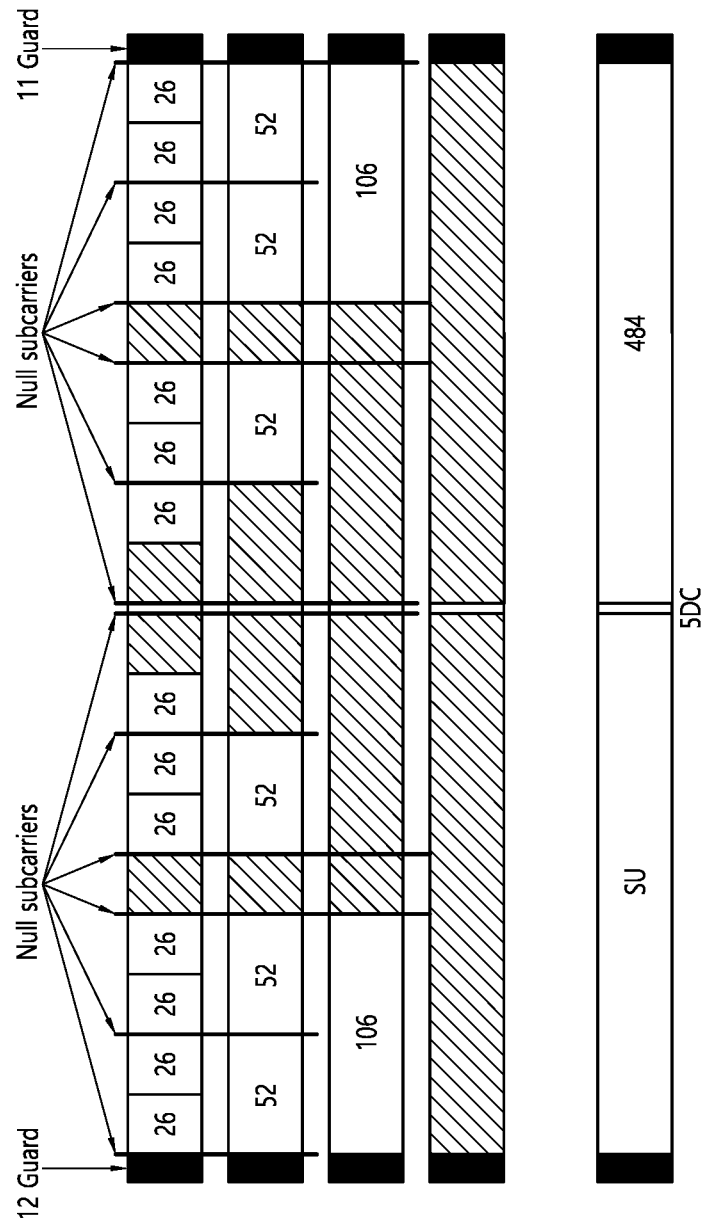
FIG. 13 illustrates an example of RU that cannot be allocated to a 20 MHz only or operating STA in a 40 MHz PPDU transmission.

FIG. 13 illustrates an example of RU that cannot be allocated to a 20 MHz only or operating STA in a 40 MHz PPDU transmission.

The present specification proposes each RU and MRU within 242 RUs that cannot be allocated to the 20 MHz only or operating STA in each bandwidth PPDU transmission situation. Since the tone plan of each bandwidth is different from the tone plan of 20 MHz, the 20 MHz only or operating STA cannot be allocated to the corresponding RU(s) and MRU(s) because the tones corresponding to the DC tone and guard tones are used for transmitting actual data during the 20 MHz receiver process. Accordingly, due to the possibility of performance degradation and interference on an adjacent channel, allocation of specific RU(s) and MRU(s) is limited. For example, as shown in FIG. 13, the RU part that is marked as a shaded area in 40 MHz corresponds to RUs including DC or guard tone(s) in the 20 MHz receiver process.

Therefore, the RUs being marked as shaded areas in FIG. 13 may not be allocated to the 20 MHz only or operating STA during the 40 MHz transmission. However, since performance degradation may be overcome in accordance with a data subcarrier loss rate, some RUs may be used being allocated to the 20 MHz only or operating STA.

3.1 20 MHz

Figure 14:
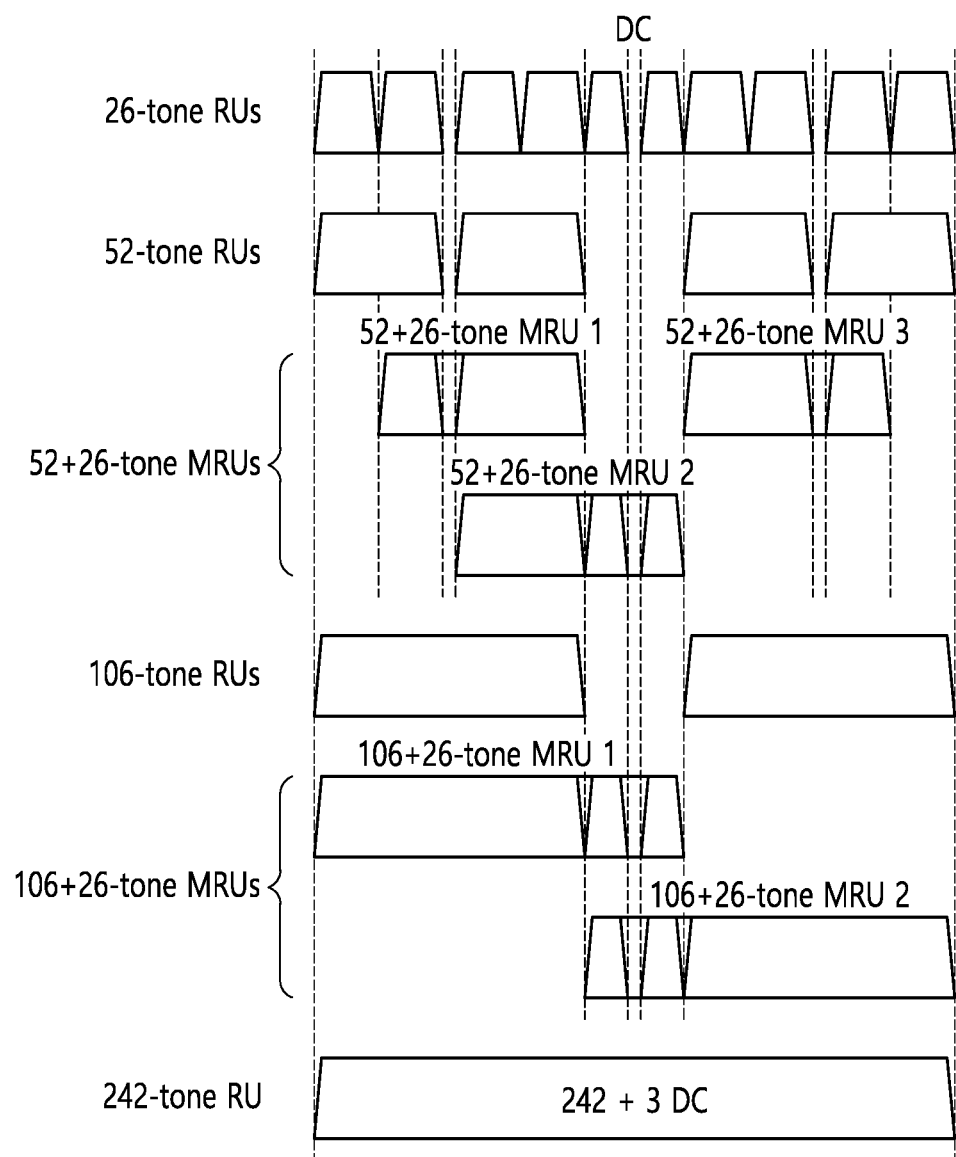
FIG. 14 illustrates examples of 26+52 tone MRUs and 26+106 tone MRUs that are used in a 20 MHz EHT PPDU OFDMA transmission.

FIG. 14 illustrates examples of 26+52 tone MRUs and 26+106 tone MRUs that are used in a 20 MHz EHT PPDU OFDMA transmission.

A 20 MHz EHT PPDU transmission uses the same tone plan as the existing 1 lax. And, most particularly, when considering 26+52RU, which corresponds to one MRU, a tone plan shown in FIG. 14 may be used. In a 20 MHz EHT PPDU, the 20 MHz only or operating STA may be allocated to all RUs and MRUs that are defined in the corresponding bandwidth.

3.2 40 MHz

Figure 15:
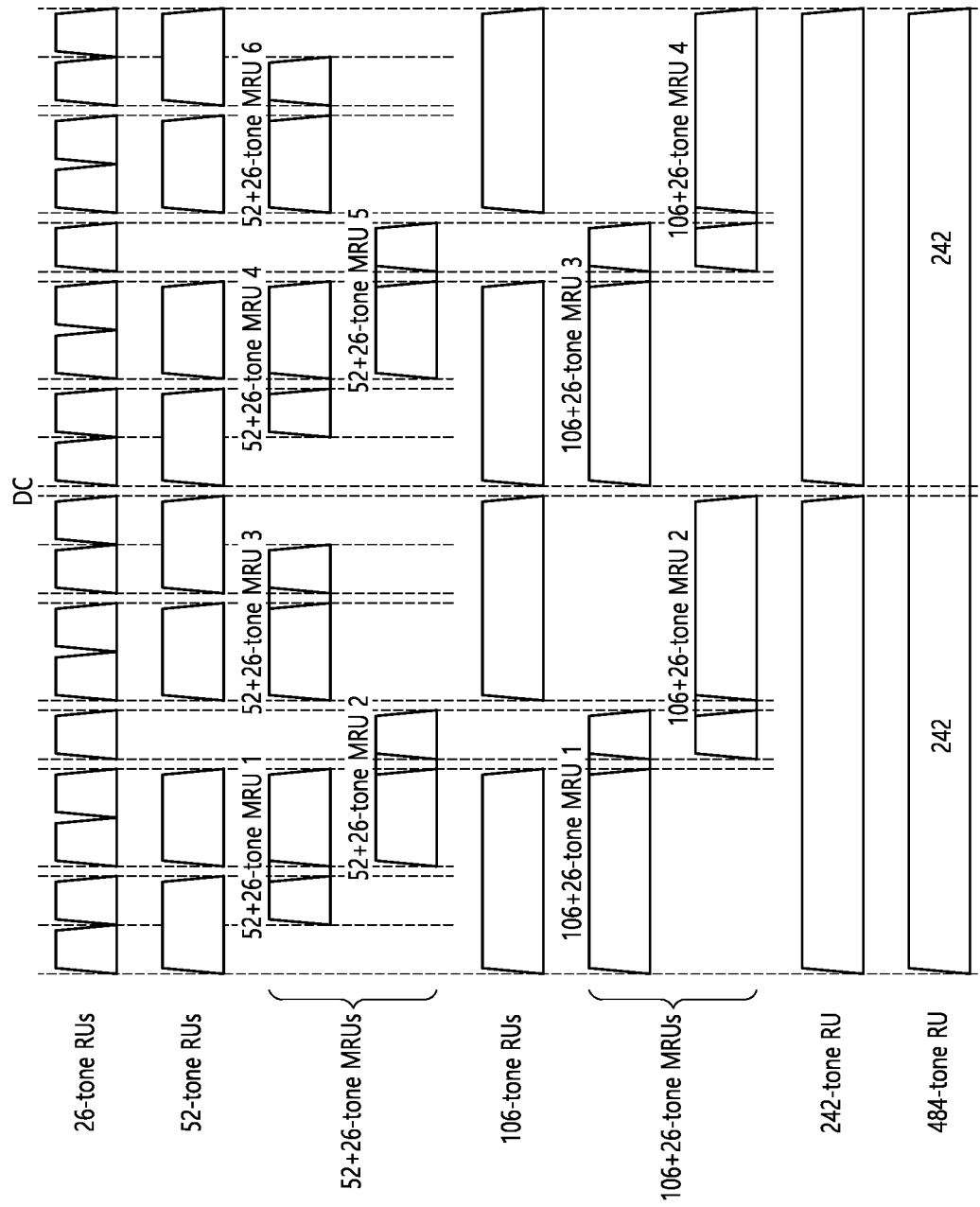
FIG. 15 illustrates examples of 26+52 tone MRUs and 26+106 tone MRUs that are used in a 40 MHz EHT PPDU OFDMA transmission.

FIG. 15 illustrates examples of 26+52 tone MRUs and 26+106 tone MRUs that are used in a 40 MHz EHT PPDU OFDMA transmission.

A 40 MHz EHT PPDU transmission uses the same tone plan as the existing 11ax. And, most particularly, when considering 26+52RU, which corresponds to one MRU, a tone plan shown in FIG. 15 may be used. RUs and MRUs that cannot be allocated to the 20 MHz only or operating STA are proposed per size of each RU and MRU, as described below. Indexes of the RUs described below are described as being the same as the RU indexes shown in Table 4.

- 26RU: 5th, 9th, 10th, 14th 26RU
- 52RU: 4th, 5th 52RU
- 26+52RU(78RU): 5th 26RU+2nd 52RU, 14th 26RU+6th 52RU
- 106RU: 2nd, 3rd 106RU
- 26+106RU: 5th 26RU+1st 106RU, 5th 26RU+2nd 106RU, 14th 26RU+3rd 106RU, 14th 26RU+4th 106RU, i.e., all 26+106RU
- 242RU: all 242RU Apart from the RUs and MRUs listed above, RUs and MRUs within another 242RU may be allocated to the 20 MHz only or operating STA.

However, when considering DC, guard tones corresponding to the 20 MHz receiver process, since the data loss rate of the underlined RUs or MRUs is not significant, sufficiently reliable performance may be achieved by coding gain, when performing decoding. Therefore, the underlined RUs or MRUs may also be allocated to the 20 MHz only or operating STA.

4.3. Each 80 MHz subchannel in a bandwidth of 80 MHz or wider

Each 80 MHz subchannel of a PPDU using bandwidths of 80 MHz and wider (160 MHz, 320 MHz) uses the legacy 11ax and the tone plan shown in FIG. 12.

Figure 16:
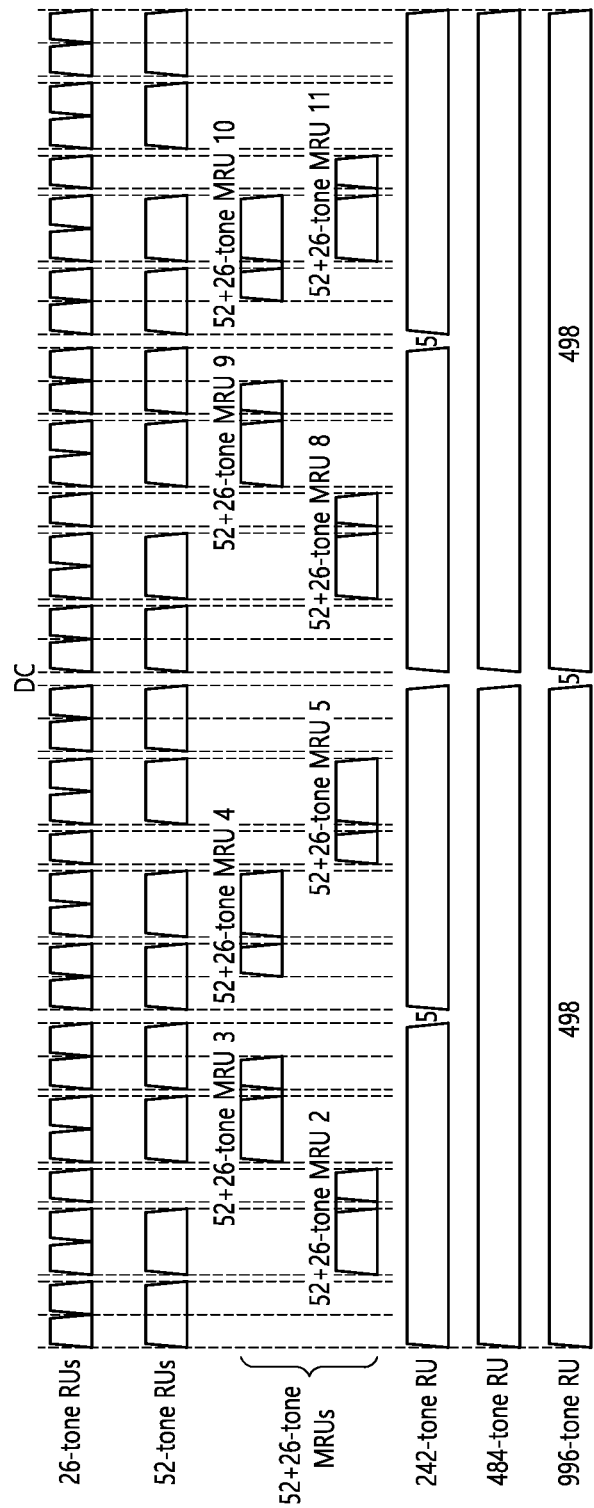
FIG. 16 illustrates examples of 26+52 tone MRUs that are used in an 80 MHz EHT PPDU OFDMA transmission.

FIG. 16 illustrates examples of 26+52 tone MRUs that are used in an 80 MHz EHT PPDU OFDMA transmission.

FIG. 16 shows a tone plan considering a 26+52 tone MRU in the tone plan of FIG. 12.

Figure 17:
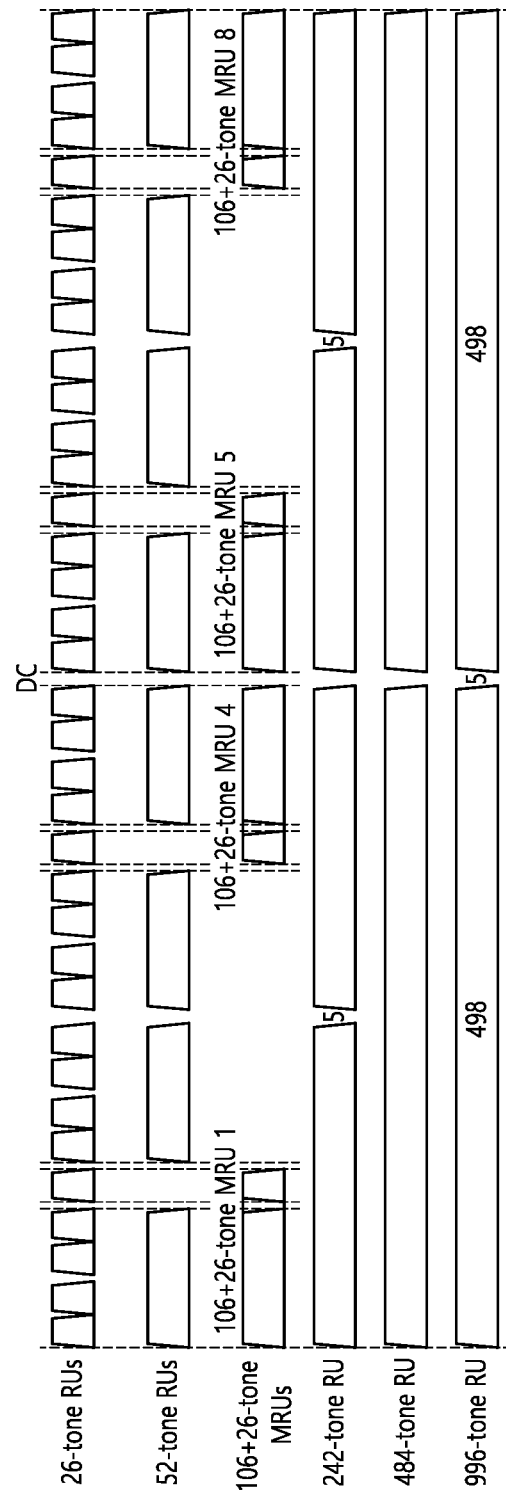
FIG. 17 illustrates examples of 26+106 tone MRUs that are used in an 80 MHz EHT PPDU OFDMA transmission.

FIG. 17 illustrates examples of 26+106 tone MRUs that are used in an 80 MHz EHT PPDU OFDMA transmission.

FIG. 17 shows a tone plan considering a 26+106 tone MRU in the tone plan of FIG. 12.

RUs and MRUs that cannot be allocated to the 20 MHz only or operating STA are proposed per size of each RU and MRU, as described below, in each 80 MHz subchannel of the PPDU using a bandwidth of 80 MHz or wider (160 MHz, 320 MHz). Indexes of the RUs described below are described as being the same as the RU indexes shown in Table 5. Herein, however, in Table 5, although the 19th 26RU, which is the middle 26RU, is indicated as an index, the corresponding RU is specified as being "not defined". Accordingly, the indexes of the RUs that will be described later on indicate that an index is not assigned for the middle 26RU. For example, the 23rd, 27th, 28th, 32nd 26RUs, which will be described later on, are respectively indicated as RU 24, RU 28, RU 29, RU 33, in Table 5.

- 26RU: 5th, 9th, 10th, 14th, 23th, 27th, 28th, 32th 26RU
- 52RU: 4th, 5th, 12th, 13th 52RU
- 26+52RU(78RU): 5th 26RU+2nd 52RU, 14th 26RU+6th 52RU, 23rd 26RU+10th 52RU, 32nd 26RU+14th 52RU
- 106RU: 2th, 3th, 6th, 7th 106RU
- 26+106RU: 5th 26RU+1st 106RU, 14th 26RU+4th 106RU, 23rd 26RU+5th 106RU, 32nd 26RU+8th 106RU, i.e., all 26+106RU
- 242RU: all 242RU Apart from the RUs and MRUs listed above, RUs and MRUs within another 242RU may be allocated to the 20 MHz only or operating STA.

However, when considering DC, guard tones corresponding to the 20 MHz receiver process, since the data loss rate of the underlined RUs or MRUs is not significant, sufficiently reliable performance may be achieved by coding gain, when performing decoding. Therefore, the underlined RUs or MRUs may also be allocated to the 20 MHz only or operating STA.

Although it is specified that the underlined RUs or MRUs can be allocated to the 20 MHz only or operating STA, among the corresponding RUs or MRUs, 26+52RUs and 26+106RUs, and all 242RUs may not be allocated to the 20 MHz only or operating STA due to the DC tone issue. Most particularly, in an uplink (UL) trigger-based (TB) PPDU, the 26+52RUs and 26+106RUs, and all 242RUs may not be allocated to the 20 MHz only or operating STA. Additionally, in a downlink (DL) transmission, although the allocation of the aforementioned underlined RUs or MRUs may not be advantageous in light of performance, since the performance may be enhanced by implementation, the corresponding RUs or MRUs may be used by being allocated to the 20 MHz only or operating STA.

Although it is specified that the underlined RUs or MRUs can be allocated to the 20 MHz only or operating STA, when performing 1024 Quadrature Amplitude Modulation (QAM) or 4096QAM or stream transmission exceeding 8 streams, part or all of the underlined RUs or MRUs may not be allocated to the 20 MHz only or operating STA. For example, when performing 1024QAM or 4096QAM or stream transmission exceeding 8 streams, among the aforementioned underlined RUs or MRUs, the 26+52RUs and 26+106RUs, and all 242RUs may not be allocated to the 20 MHz only or operating STA.

Figure 18:
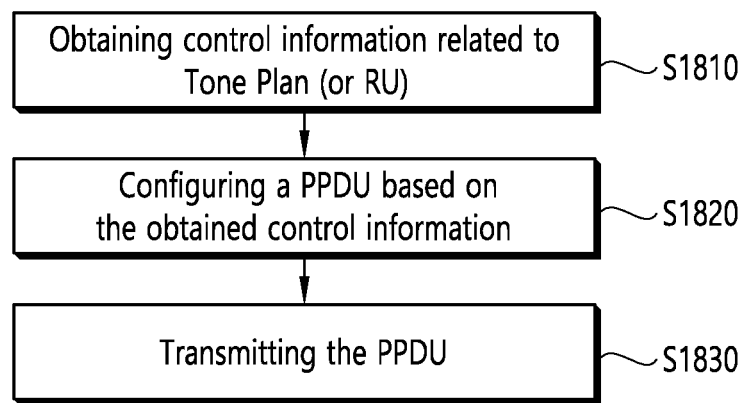
FIG. 18 is a procedure flowchart showing operations of a transmitting device according to the present embodiment.

FIG. 18 is a procedure flowchart showing operations of a transmitting device according to the present embodiment.

An example of FIG. 18 may be performed by a transmitting STA or transmitting device (AP and/or non-AP STA).

Part of the steps (or detailed sub-steps that will be described later on) in the example of FIG. 18 may be skipped (or omitted) or varied.

By performing step S1810, the transmitting device (transmitting STA) may obtain information related to the above-described tone plan. As described above, the information related to the tone plan includes RU size, RU location, control information related to the RU(s), information related to a frequency band including the RU(s), information on an STA receiving the RU(s), and so on.

By performing step S1820, the transmitting device may configure/generate a PPDU based on the obtained control information. The step of configuring/generating a PPDU may include a step of configuring/generating each field of the PPDU. That is, step S1820 includes a step of configuring an EHT-SIG field including control information related to a Tone Plan.

That is, step S1820 may include a step of configuring a field including control information indicating RU size/location (e.g., N bitmap), and/or a step of configuring a field including an identifier (e.g., AID) of an STA receiving the RU.

Additionally, step S1820 may include a step of generating an STF/LTF sequence that is transmitted through a specific RU. The STF/LTF sequence may be generated based on a preset STF generating sequence/LTF generating sequence.

Additionally, step S1820 may include a step of generating a data field (i.e., MPDU) that is transmitted through a specific RU.

The transmitting device may transmit the PPDU that is configured by performing step S1820, to the receiving device, based on step S1830.

While performing step S1830, the transmitting device may perform at least one of the operations of CSD, Spatial Mapping, IDFT/IFFT operation, GI insertion, and so on.

The signal(s)/field(s)/sequences(s) that is/are configured according to the present specification may be transmitted in the format of FIG. 10.

Figure 19:
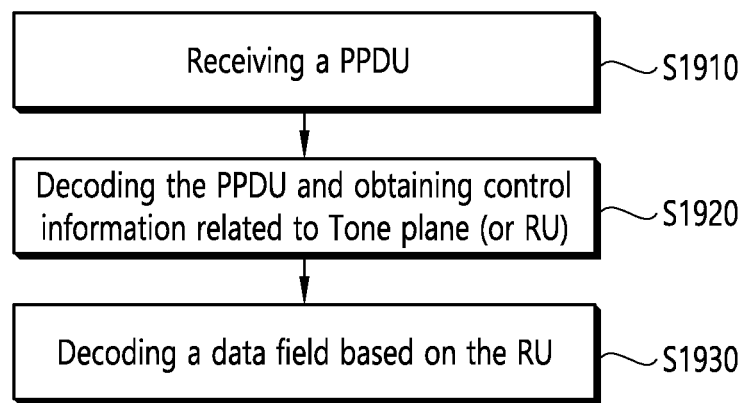
FIG. 19 is a procedure flowchart showing operations of a receiving device according to the present embodiment.

FIG. 19 is a procedure flowchart showing operations of a receiving device according to the present embodiment.

The above-described PPDU may be received according to the example of FIG. 18.

An example of FIG. 19 may be performed by a receiving STA or receiving device (AP and/or non-AP STA).

Part of the steps (or detailed sub-steps that will be described later on) in the example of FIG. 19 may be skipped (or omitted).

The receiving device (receiving STA) may receive all or part of a PPDU by performing step S1910. The received signal may have the format shown in FIG. 10.

A sub-step of step S1910 may be determined based on step S1830 of FIG. 18. That is, step S1910 may perform operations of recovering (or reconfiguring) the results of the operations of CSD, Spatial Mapping, IDFT/IFFT operation, GI insertion, and so on, which are applied in step S1830.

In step S1920, the receiving device may perform decoding on all/part of the PPDU.

Additionally, the receiving device may obtain control information related to a Tone Plan (i.e., RU) from the decoded PPDU.

More specifically, the receiving device may decode an L-SIG and EHT-SIG of the PPDU based on Legacy STF/LTF and may obtain information that is included in the L-SIG and EHT SIG fields. Information related to various Tone Plans (i.e., RUs) specified in the present specification may be included in the EHT-SIG, and the receiving STA may obtain information related to the Tone Plans (i.e., RUs) through the EHT-SIG.

In step S1930, the receiving device may decode the remaining part of the PPDU based on the information related to the Tone Plans (i.e., RUs) that is obtained by performing step S1920. For example, the receiving STA may decode the STF/LTF field(s) of the PPDU based on the information related to the Tone Plans (i.e., RUs). Additionally, the receiving STA may decode the data field of the PPDU based on the information related to the Tone Plans (i.e., RUs) and may obtain an MPDU that is included in the data field.

Additionally, the receiving device may perform a processing operation of forwarding (or delivering) decoded data, which is decoded by performing step S1930, to a higher layer (e.g., MAC layer). Additionally, in case signal generation is instructed from the higher layer to a PHY layer for the data being delivered to the higher layer, the subsequent operation may be performed.

Hereinafter, the above-described embodiments will be described in more detail with reference to FIG. 1 to FIG. 19.

Figure 20:
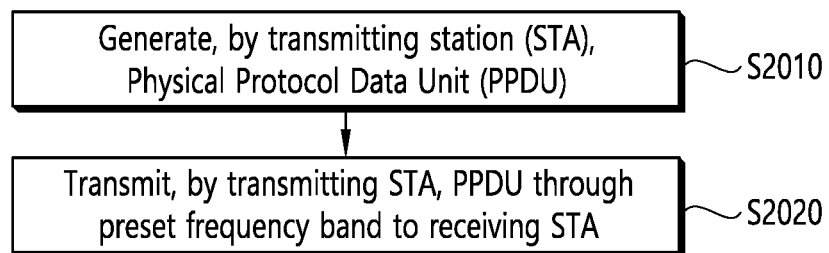
FIG. 20 is a flowchart showing a procedure of performing allocation, by the AP, by limiting RUs or MRUs for an STA operating only in a 20 MHz band according to the present embodiment.

FIG. 20 is a flowchart showing a procedure of performing allocation, by the AP, by limiting RUs or MRUs for an STA operating only in a 20 MHz band according to the present embodiment.

The example of FIG. 20 may be performed in a network environment in which a next generation WLAN system (IEEE 802.11be or EHT WLAN system) is being supported. The next generation wireless LAN system is a WLAN system that is enhanced from an 802.1 lax system and may, therefore, satisfy backward compatibility with the 802.11ax system.

The example of FIG. 20 may be performed by a transmitting station (STA), and the transmitting STA may correspond to an access point (AP) STA. A receiving STA of FIG. 20 may correspond to a non-AP STA that operates only in a 20 MHz band.

The present embodiment proposes a method for configuring RU and MRU that cannot be allocated (that are limited (or restricted) for allocation) to an STA operating only in a 20 MHz band based on an 80 MHz band tone plan, which is newly defined in an 802.11 be WLAN system.

In step S2010, a transmitting STA generates a Physical Protocol Data Unit (PPDU).

In step S2020, the transmitting STA transmits the PPDU to a receiving STA through a preset frequency band.

The receiving STA is an STA that operates only in a 20 MHz band.

The PPDU includes a preamble and a data field. And, the data field is received through resources other than a first resource unit (RU) and a first multiple RUs (MRU) among the preset frequency band. The first MRU is newly defined in the 802.11be wireless LAN system as multiple RUs having 2 RUs aggregated therein.

When the preset frequency band is a 40 MHz band, an RU layout (or tone plan) for the 40 MHz band is as described below. The tone plan for the 40 MHz band is the same in both 802.1 lax and 802.11be WLAN systems.

When the 40 MHz band consists of only 26 tone RUs, the 40 MHz band includes first to 18th 26 tone RUs. When the 40 MHz band consists of only 52 tone RUs, the 40 MHz band includes first to 8th 52 tone RUs. When the 40 MHz band consists of only 106 tone RUs, the 40 MHz band includes first to 4th 106 tone RUs. And, when the 40 MHz band consists only of 242 tone RUs, the 40 MHz band includes first and second 242 tone RUs.

At this point, the first to 18th 26 tone RUs may be arranged by an order starting from a 26 tone RU having a low frequency to a 26 tone RU having a high frequency. The first to 8th 52 tone RUs may be arranged by an order starting from a 52 tone RU having a low frequency to a 52 tone RU having a high frequency. The first to 4th 106 tone RUs may be arranged by an order starting from a 106 tone RU having a low frequency to a 106 tone RU having a high frequency. And, the first and second 242 tone RUs may be arranged by an order starting from a 242 tone RU having a low frequency to a 242 tone RU having a high frequency.

The first RU includes the 5th and 14th 26 tone RUs and the first and second 242 tone RUs. That is, the 5th and 14th 26 tone RUs and the first and second 242 tone RUs correspond to resources that are not allocated to the receiving STA.

The first MRU includes an MRU in which the 5th 26 tone RU and the second 52 tone RU are aggregated, an MRU in which the 14th 26 tone RU and the 6th 52 tone RU are aggregated, an MRU in which the 5th 26 tone RU and the first 106 tone RU are aggregated, an MRU in which the 5th 26 tone RU and the second 106 tone RU are aggregated, an MRU in which the 14th 26 tone RU and the 3rd 106 tone RU are aggregated, and an MRU in which the 14th 26 tone RU and the 4th 106 tone RU are aggregated. That is, the multiple RUs included in the first MRU also correspond to resources that are not allocated to the receiving STA.

The present embodiment proposes a method according to which the receiving STA is allocated only to remaining units (RUs) excluding the first RU and the first MRU, when the receiving STA receives an OFDMA PPDU through a 40 MHz band. Thus, the present disclosure may have a new effect of being capable of preventing performance degradation and interference of an adjacent channel from occurring by preventing data from being loaded on tones corresponding to DC tones and guard tones at 20 MHz, where the receiving STA can be operated.

Additionally, when the receiving STA that operates only in a 20 MHz band receives an OFDMA PPDU through an 80 MHz band, a method of the receiving STA being allocated only to resource units other than the first RU and the first MRU may be proposed as described below.

When the preset frequency band is an 80 MHz band, a layout (or tone plan) of RUs for the 80 MHz band is as described below. Since the tone plan for the 80 MHz band that is proposed in the 802.11be WLAN system and the tone plan for the 80 MHz band that is proposed in the 802.1lax WLAN system are different, RU and MRU limitations need to be newly set (or configured).

When the 80 MHz band consists of only 26 tone RUs, the 80 MHz band may include first to 36th 26 tone RUs. When the 80 MHz band consists of only 52 tone RUs, the 80 MHz band may include first to 16th 52 tone RUs. When the 80 MHz band consists of only 106 tone RUs, the 80 MHz band may include first to 8th 106 tone RUs. And, when the 80 MHz band consists only of 242 tone RUs, the 80 MHz band may include first to 4th 242 tone RUs.

At this point, the first to 36th 26 tone RUs may be arranged by an order starting from a 26 tone RU having a low frequency to a 26 tone RU having a high frequency, the first to 16th 52 tone RUs may be arranged by an order starting from a 52 tone RU having a low frequency to a 52 tone RU having a high frequency, the first to 8th 106 tone RUs may be arranged by an order starting from a 106 tone RU having a low frequency to a 106 tone RU having a high frequency, and the first to 4th 242 tone RUs may be arranged by an order starting from a 242 tone RU having a low frequency to a 242 tone RU having a high frequency.

The first RU may include the 5th, 14th, 23rd, and 32nd 26 tone RUs and the first to 4th 242 tone RUs. That is, the 5th, 14th, 23rd, and 32nd 26 tone RUs and the first to 4th 242 tone RUs correspond to resources that are not allocated to the receiving STA.

The first MRU may include an MRU in which the 5th 26 tone RU and the second 52 tone RU are aggregated, an MRU in which the 14th 26 tone RU and the 6th 52 tone RU are aggregated, an MRU in which the 23rd 26 tone RU and the 10th 52 tone RU are aggregated, an MRU in which the 32nd 26 tone RU and the 14th 52 tone RU are aggregated, an MRU in which the 5th 26 tone RU and the first 106 tone RU are aggregated, an MRU in which the 14th 26 tone RU and the 4th 106 tone RU are aggregated, an MRU in which the 23rd 26 tone RU and the 5th 106 tone RU are aggregated, and an MRU in which the 32nd 26 tone RU and the 8th 106 tone RU are aggregated. That is, the multiple RUs included in the first MRU also correspond to resources that are not allocated to the receiving STA.

Additionally, when the receiving STA that operates only in a 20 MHz band receives an OFDMA PPDU through a 160 MHz band, a method of the receiving STA being allocated only to resource units other than the first RU and the first MRU may be proposed as described below.

When the preset frequency band is a 160 MHz band, a layout (or tone plan) of RUs for the 160 MHz band is as described below. The tone plan for the 160 MHz band that is proposed in the 802.11be WLAN system is the same as a tone plan repeating two times the tone plan for the 80 MHz band that is proposed in the 802.11be WLAN system. The 160 MHz band may include first and second 80 MHz subchannels.

When the first 80 MHz subchannel consists of only 26 tone RUs, the first 80 MHz subchannel may include first to 36th 26 tone RUs, when the first 80 MHz subchannel consists of only 52 tone RUs, the first 80 MHz subchannel may include first to 16th 52 tone RUs, when the first 80 MHz subchannel consists of only 106 tone RUs, the first 80 MHz subchannel may include first to 8th 106 tone RUs, and when the first 80 MHz subchannel consists only of 242 tone RUs, the first 80 MHz subchannel may include first to 4th 242 tone RUs.

When the second 80 MHz subchannel consists of only 26 tone RUs, the second 80 MHz subchannel may include 37th to 72nd 26 tone RUs, when the second 80 MHz subchannel consists of only 52 tone RUs, the second 80 MHz subchannel may include 17th to 32nd 52 tone RUs, when the second 80 MHz subchannel consists of only 106 tone RUs, the second 80 MHz subchannel may include 9th to 16th 106 tone RUs, and when the second 80 MHz subchannel consists only of 242 tone RUs, the second 80 MHz subchannel may include 5th to 8th 242 tone RUs.

At this point, the first to 72nd 26 tone RUs may be arranged by an order starting from a 26 tone RU having a low frequency to a 26 tone RU having a high frequency, the first to 36th 52 tone RUs may be arranged by an order starting from a 52 tone RU having a low frequency to a 52 tone RU having a high frequency, the first to 16th 106 tone RUs may be arranged by an order starting from a 106 tone RU having a low frequency to a 106 tone RU having a high frequency, and the first to 8th 242 tone RUs may be arranged by an order starting from a 242 tone RU having a low frequency to a 242 tone RU having a high frequency.

The first RU includes the 5th, 14th, 23rd, 32nd, 41st, 50th, 59th, and 68th 26 tone RUs and the first to 8th 242 tone RUs. That is, the 5th, 14th, 23rd, 32nd, 41st, 50th, 59th, and 68th 26 tone RUs and the first to 8th 242 tone RUs correspond to resources that are not allocated to the receiving STA.

The first MRU may include an MRU in which the 5th 26 tone RU and the second 52 tone RU are aggregated, an MRU in which the 14th 26 tone RU and the 6th 52 tone RU are aggregated, an MRU in which the 23rd 26 tone RU and the 10th 52 tone RU are aggregated, an MRU in which the 32nd 26 tone RU and the 14th 52 tone RU are aggregated, an MRU in which the 41st 26 tone RU and the 18th 52 tone RU are aggregated, an MRU in which the 50th 26 tone RU and the 22nd 52 tone RU are aggregated, an MRU in which the 59th 26 tone RU and the 26th 52 tone RU are aggregated, an MRU in which the 68th 26 tone RU and the 30th 52 tone RU are aggregated, an MRU in which the 5th 26 tone RU and the first 106 tone RU are aggregated, an MRU in which the 14th 26 tone RU and the 4th 106 tone RU are aggregated, an MRU in which the 23rd 26 tone RU and the 5th 106 tone RU are aggregated, and an MRU in which the 32nd 26 tone RU and the 8th 106 tone RU are aggregated, an MRU in which the 41st 26 tone RU and the 9th 106 tone RU are aggregated, an MRU in which the 50th 26 tone RU and the 12th 106 tone RU are aggregated, an MRU in which the 59th 26 tone RU and the 13th 106 tone RU are aggregated, and an MRU in which the 68th 26 tone RU and the 16th 106 tone RU are aggregated. That is, the multiple RUs included in the first MRU also correspond to resources that are not allocated to the receiving STA.

Additionally, when the receiving STA that operates only in a 20 MHz band receives an OFDMA PPDU through a 320 MHz band, a method of the receiving STA being allocated only to resource units other than the first RU and the first MRU may be proposed as described below.

When the preset frequency band is a 320 MHz band, a layout (or tone plan) of RUs for the 320 MHz band is as described below. The tone plan for the 320 MHz band that is proposed in the 802.11be WLAN system is the same as a tone plan repeating four times the tone plan for the 80 MHz band that is proposed in the 802.11be WLAN system. The 320 MHz band may include first to 4th 80 MHz subchannels.

When the first 80 MHz subchannel consists of only 26 tone RUs, the first 80 MHz subchannel may include first to 36th 26 tone RUs, when the first 80 MHz subchannel consists of only 52 tone RUs, the first 80 MHz subchannel may include first to 16th 52 tone RUs, when the first 80 MHz subchannel consists of only 106 tone RUs, the first 80 MHz subchannel may include first to 8th 106 tone RUs, and when the first 80 MHz subchannel consists only of 242 tone RUs, the first 80 MHz subchannel may include first to 4th 242 tone RUs.

When the second 80 MHz subchannel consists of only 26 tone RUs, the second 80 MHz subchannel may include 37th to 72nd 26 tone RUs, when the second 80 MHz subchannel consists of only 52 tone RUs, the second 80 MHz subchannel may include 17th to 32nd 52 tone RUs, when the second 80 MHz subchannel consists of only 106 tone RUs, the second 80 MHz subchannel may include 9th to 16th 106 tone RUs, and when the second 80 MHz subchannel consists only of 242 tone RUs, the second 80 MHz subchannel may include 5th to 8th 242 tone RUs.

When the third 80 MHz subchannel consists of only 26 tone RUs, the third 80 MHz subchannel may include 73rd to 108th 26 tone RUs, when the third 80 MHz subchannel consists of only 52 tone RUs, the third 80 MHz subchannel may include 33rd to 48th 52 tone RUs, when the third 80 MHz subchannel consists of only 106 tone RUs, the third 80 MHz subchannel may include 17th to 24th 106 tone RUs, and when the third 80 MHz subchannel consists only of 242 tone RUs, the third 80 MHz subchannel may include 9th to 12th 242 tone RUs.

When the fourth 80 MHz subchannel consists of only 26 tone RUs, the fourth 80 MHz subchannel may include 109th to 144th 26 tone RUs, when the fourth 80 MHz subchannel consists of only 52 tone RUs, the fourth 80 MHz subchannel may include 49th to 64th 52 tone RUs, when the fourth 80 MHz subchannel consists of only 106 tone RUs, the fourth 80 MHz subchannel may include 25th to 32nd 106 tone RUs, and when the fourth 80 MHz subchannel consists only of 242 tone RUs, the fourth 80 MHz subchannel may include 13th to 16th 242 tone RUs.

At this point, the first to 144th 26 tone RUs may be arranged by an order starting from a 26 tone RU having a low frequency to a 26 tone RU having a high frequency, the first to 64th 52 tone RUs may be arranged by an order starting from a 52 tone RU having a low frequency to a 52 tone RU having a high frequency, the first to 32nd 106 tone RUs may be arranged by an order starting from a 106 tone RU having a low frequency to a 106 tone RU having a high frequency, and the first to 16th 242 tone RUs may be arranged by an order starting from a 242 tone RU having a low frequency to a 242 tone RU having a high frequency.

The first RU may include the 5th, 14th, 23rd, 32nd, 41st, 50th, 59th, 68th, 77th, 86th, 95th, 104th, 113th, 122nd, 131st, and 140th, 26 tone RUs and the first to 16th 242 tone RUs. That is, the 5th, 14th, 23rd, 32nd, 41st, 50th, 59th, 68th, 77th, 86th, 95th, 104th, 113th, 122nd, 131st, and 140th, 26 tone RUs and the first to 16th 242 tone RUs correspond to resources that are not allocated to the receiving STA.

The first MRU may include an MRU in which the 5th 26 tone RU and the second 52 tone RU are aggregated, an MRU in which the 14th 26 tone RU and the 6th 52 tone RU are aggregated, an MRU in which the 23rd 26 tone RU and the 10th 52 tone RU are aggregated, an MRU in which the 32nd 26 tone RU and the 14th 52 tone RU are aggregated, an MRU in which the 41st 26 tone RU and the 18th 52 tone RU are aggregated, an MRU in which the 50th 26 tone RU and the 22nd 52 tone RU are aggregated, an MRU in which the 59th 26 tone RU and the 26th 52 tone RU are aggregated, an MRU in which the 68th 26 tone RU and the 30th 52 tone RU are aggregated, an MRU in which the 77th 26 tone RU and the 34th 52 tone RU are aggregated, an MRU in which the 86th 26 tone RU and the 38th 52 tone RU are aggregated, an MRU in which the 95th 26 tone RU and the 42nd 52 tone RU are aggregated, an MRU in which the 104th 26 tone RU and the 46th 52 tone RU are aggregated, an MRU in which the 113th 26 tone RU and the 50th 52 tone RU are aggregated, an MRU in which the 122nd 26 tone RU and the 54th 52 tone RU are aggregated, an MRU in which the 131st 26 tone RU and the 58th 52 tone RU are aggregated, an MRU in which the 140th 26 tone RU and the 62nd 52 tone RU are aggregated, an MRU in which the 5th 26 tone RU and the first 106 tone RU are aggregated, an MRU in which the 14th 26 tone RU and the 4th 106 tone RU are aggregated, an MRU in which the 23rd 26 tone RU and the 5th 106 tone RU are aggregated, and an MRU in which the 32nd 26 tone RU and the 8th 106 tone RU are aggregated, an MRU in which the 41st 26 tone RU and the 9th 106 tone RU are aggregated, an MRU in which the 50th 26 tone RU and the 12th 106 tone RU are aggregated, an MRU in which the 59th 26 tone RU and the 13th 106 tone RU are aggregated, and an MRU in which the 68th 26 tone RU and the 16th 106 tone RU are aggregated, an MRU in which the 77th 26 tone RU and the 17th 106 tone RU are aggregated, an MRU in which the 86th 26 tone RU and the 20th 106 tone RU are aggregated, an MRU in which the 95th 26 tone RU and the 21st 106 tone RU are aggregated, an MRU in which the 104th 26 tone RU and the 24th 106 tone RU are aggregated, an MRU in which the 113th 26 tone RU and the 25th 106 tone RU are aggregated, an MRU in which the 122nd 26 tone RU and the 28th 106 tone RU are aggregated, an MRU in which the 131st 26 tone RU and the 29th 106 tone RU are aggregated, and an MRU in which the 140th 26 tone RU and the 32nd 106 tone RU are aggregated. That is, the multiple RUs included in the first MRU also correspond to resources that are not allocated to the receiving STA.

The PPDU may be a DL OFDMA PPDU or UL OFDMA PPDU. When the PPDU is a DL OFDMA PPDU, the transmitting STA may transmit an Extremely High Throughput (EHT) Multi User (MU) PPDU to the receiving STA, and the receiving STA may decode the EHT MU PPDU through resources other than the first RU and the first MRU among the preset frequency band. And, when the PPDU is an Uplink (UL) OFDMA PPDU, the transmitting STA is an STA that operates only in a 20 MHz band, and the transmitting STA receives a trigger frame from the receiving STA (herein, the AP). And, the transmitting STA may transmit a Trigger Based (TB) PPDU to the receiving STA. At this point, and the EHT TB PPDU may be transmitted through resources other than the first RU and the first MRU among the preset frequency band. The EHT MU PPDU may include Legacy-Short Training Field (L-STF), Legacy-Long Training Field (L-LTF), Legacy-Signal (L-SIG), Repeated L-SIG (RL-SIG), Universal-Signal (U-SIG), EHT-SIG, EHT-STF, and EHT-LTFs data fields. The EHT TB PPDU is defined as a format excluding the EHT-SIG from the EHT MU PPDU.

Additionally, when the PPDU is a DL OFDMA PPDU, 242 tone RUs that are included in the preset frequency band may be optionally allocated. For example, when the PPDU is a DL OFDMA PPDU that is received through a 40 MHz band, the first RU may optionally include the first and second 242 tone RUs. That is, the transmitting STA may optionally allocate the first and second 242 RU tones to the receiving STA. If the first RU includes only the first 242 tone RU and does not include the second 242 tone RU, the receiving STA may receive the DL OFDMA PPDU through the second 242 tone RU (in case the receiving STA has capability for the second 242 tone RU). This may also be identically applied when the preset frequency band is an 80 MHz, 160 MHz, 320 MHz band.

Figure 21:
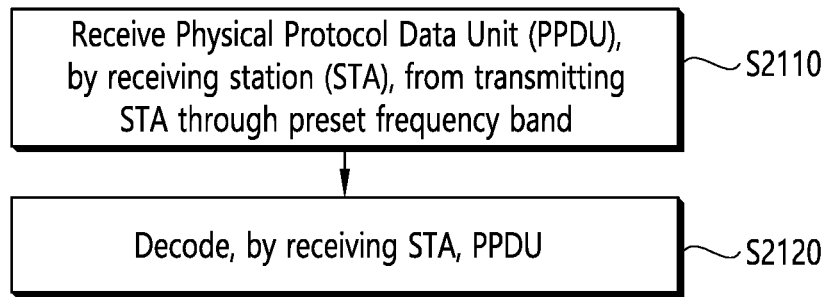
FIG. 21 is a flowchart showing a procedure of receiving allocation, by an STA operating only in a 20 MHz band, by limiting RUs or MRUs according to the present embodiment.

FIG. 21 is a flowchart showing a procedure of receiving allocation, by an STA operating only in a 20 MHz band, by limiting RUs or MRUs according to the present embodiment.

The example of FIG. 21 may be performed in a network environment in which a next generation WLAN system is being supported. The next generation wireless LAN system is a WLAN system that is enhanced from an 802.1 lax system and may, therefore, satisfy backward compatibility with the 802.11ax system.

The example of FIG. 21 may be performed by a receiving station (STA), and the receiving STA may correspond to a non-AP STA operating only in a 20 MHz band. A transmitting STA of FIG. 21 may correspond to an access point (AP) STA.

The present embodiment proposes a method for configuring RU and MRU that cannot be allocated (that are limited (or restricted) for allocation) to an STA operating only in a 20 MHz band based on an 80 MHz band tone plan, which is newly defined in an 802.11be WLAN system.

In step S2110, a receiving station (STA) receives a Physical Protocol Data Unit (PPDU) from a transmitting STA through a preset frequency band.

In step S2120, the receiving STA decodes the PPDU.

The receiving STA is an STA that operates only in a 20 MHz band.

The PPDU includes a preamble and a data field. And, the data field is received through resources other than a first resource unit (RU) and a first multiple RUs (MRU) among the preset frequency band. The first MRU is newly defined in the 802.11be wireless LAN system as multiple RUs having 2 RUs aggregated therein.

When the preset frequency band is a 40 MHz band, an RU layout (or tone plan) for the 40 MHz band is as described below. The tone plan for the 40 MHz band is the same in both 802.1 lax and 802.11be WLAN systems.

When the 40 MHz band consists of only 26 tone RUs, the 40 MHz band includes first to 18th 26 tone RUs. When the 40 MHz band consists of only 52 tone RUs, the 40 MHz band includes first to 8th 52 tone RUs. When the 40 MHz band consists of only 106 tone RUs, the 40 MHz band includes first to 4th 106 tone RUs. And, when the 40 MHz band consists only of 242 tone RUs, the 40 MHz band includes first and second 242 tone RUs.

At this point, the first to 18th 26 tone RUs may be arranged by an order starting from a 26 tone RU having a low frequency to a 26 tone RU having a high frequency. The first to 8th 52 tone RUs may be arranged by an order starting from a 52 tone RU having a low frequency to a 52 tone RU having a high frequency. The first to 4th 106 tone RUs may be arranged by an order starting from a 106 tone RU having a low frequency to a 106 tone RU having a high frequency. And, the first and second 242 tone RUs may be arranged by an order starting from a 242 tone RU having a low frequency to a 242 tone RU having a high frequency.

The first RU includes the 5th and 14th 26 tone RUs and the first and second 242 tone RUs. That is, the 5th and 14th 26 tone RUs and the first and second 242 tone RUs correspond to resources that are not allocated to the receiving STA.

The first MRU includes an MRU in which the 5th 26 tone RU and the second 52 tone RU are aggregated, an MRU in which the 14th 26 tone RU and the 6th 52 tone RU are aggregated, an MRU in which the 5th 26 tone RU and the first 106 tone RU are aggregated, an MRU in which the 5th 26 tone RU and the second 106 tone RU are aggregated, an MRU in which the 14th 26 tone RU and the 3rd 106 tone RU are aggregated, and an MRU in which the 14th 26 tone RU and the 4th 106 tone RU are aggregated. That is, the multiple RUs included in the first MRU also correspond to resources that are not allocated to the receiving STA.

The present embodiment proposes a method according to which the receiving STA is allocated only to remaining units (RUs) excluding the first RU and the first MRU, when the receiving STA receives an OFDMA PPDU through a 40 MHz band. Thus, the present disclosure may have a new effect of being capable of preventing performance degradation and interference of an adjacent channel from occurring by preventing data from being loaded on tones corresponding to DC tones and guard tones at 20 MHz, where the receiving STA can be operated.

Additionally, when the receiving STA that operates only in a 20 MHz band receives an OFDMA PPDU through an 80 MHz band, a method of the receiving STA being allocated only to resource units other than the first RU and the first MRU may be proposed as described below.

When the preset frequency band is an 80 MHz band, a layout (or tone plan) of RUs for the 80 MHz band is as described below. Since the tone plan for the 80 MHz band that is proposed in the 802.11be WLAN system and the tone plan for the 80 MHz band that is proposed in the 802.1 lax WLAN system are different, RU and MRU limitations need to be newly set (or configured).

When the 80 MHz band consists of only 26 tone RUs, the 80 MHz band may include first to 36th 26 tone RUs. When the 80 MHz band consists of only 52 tone RUs, the 80 MHz band may include first to 16th 52 tone RUs. When the 80 MHz band consists of only 106 tone RUs, the 80 MHz band may include first to 8th 106 tone RUs. And, when the 80 MHz band consists only of 242 tone RUs, the 80 MHz band may include first to 4th 242 tone RUs.

At this point, the first to 36th 26 tone RUs may be arranged by an order starting from a 26 tone RU having a low frequency to a 26 tone RU having a high frequency, the first to 16th 52 tone RUs may be arranged by an order starting from a 52 tone RU having a low frequency to a 52 tone RU having a high frequency, the first to 8th 106 tone RUs may be arranged by an order starting from a 106 tone RU having a low frequency to a 106 tone RU having a high frequency, and the first to 4th 242 tone RUs may be arranged by an order starting from a 242 tone RU having a low frequency to a 242 tone RU having a high frequency.

The first RU may include the 5th, 14th, 23rd, and 32nd 26 tone RUs and the first to 4th 242 tone RUs. That is, the 5th, 14th, 23rd, and 32nd 26 tone RUs and the first to 4th 242 tone RUs correspond to resources that are not allocated to the receiving STA.

The first MRU may include an MRU in which the 5th 26 tone RU and the second 52 tone RU are aggregated, an MRU in which the 14th 26 tone RU and the 6th 52 tone RU are aggregated, an MRU in which the 23rd 26 tone RU and the 10th 52 tone RU are aggregated, an MRU in which the 32nd 26 tone RU and the 14th 52 tone RU are aggregated, an MRU in which the 5th 26 tone RU and the first 106 tone RU are aggregated, an MRU in which the 14th 26 tone RU and the 4th 106 tone RU are aggregated, an MRU in which the 23rd 26 tone RU and the 5th 106 tone RU are aggregated, and an MRU in which the 32nd 26 tone RU and the 8th 106 tone RU are aggregated. That is, the multiple RUs included in the first MRU also correspond to resources that are not allocated to the receiving STA.

Additionally, when the receiving STA that operates only in a 20 MHz band receives an OFDMA PPDU through a 160 MHz band, a method of the receiving STA being allocated only to resource units other than the first RU and the first MRU may be proposed as described below.

When the preset frequency band is a 160 MHz band, a layout (or tone plan) of RUs for the 160 MHz band is as described below. The tone plan for the 160 MHz band that is proposed in the 802.11be WLAN system is the same as a tone plan repeating two times the tone plan for the 80 MHz band that is proposed in the 802.11be WLAN system. The 160 MHz band may include first and second 80 MHz subchannels.

When the first 80 MHz subchannel consists of only 26 tone RUs, the first 80 MHz subchannel may include first to 36th 26 tone RUs, when the first 80 MHz subchannel consists of only 52 tone RUs, the first 80 MHz subchannel may include first to 16th 52 tone RUs, when the first 80 MHz subchannel consists of only 106 tone RUs, the first 80 MHz subchannel may include first to 8th 106 tone RUs, and when the first 80 MHz subchannel consists only of 242 tone RUs, the first 80 MHz subchannel may include first to 4th 242 tone RUs.

When the second 80 MHz subchannel consists of only 26 tone RUs, the second 80 MHz subchannel may include 37th to 72nd 26 tone RUs, when the second 80 MHz subchannel consists of only 52 tone RUs, the second 80 MHz subchannel may include 17th to 32nd 52 tone RUs, when the second 80 MHz subchannel consists of only 106 tone RUs, the second 80 MHz subchannel may include 9th to 16th 106 tone RUs, and when the second 80 MHz subchannel consists only of 242 tone RUs, the second 80 MHz subchannel may include 5th to 8th 242 tone RUs.

At this point, the first to 72nd 26 tone RUs may be arranged by an order starting from a 26 tone RU having a low frequency to a 26 tone RU having a high frequency, the first to 36th 52 tone RUs may be arranged by an order starting from a 52 tone RU having a low frequency to a 52 tone RU having a high frequency, the first to 16th 106 tone RUs may be arranged by an order starting from a 106 tone RU having a low frequency to a 106 tone RU having a high frequency, and the first to 8th 242 tone RUs may be arranged by an order starting from a 242 tone RU having a low frequency to a 242 tone RU having a high frequency.

The first RU includes the 5th, 14th, 23rd, 32nd, 41st, 50th, 59th, and 68th 26 tone RUs and the first to 8th 242 tone RUs. That is, the 5th, 14th, 23rd, 32nd, 41st, 50th, 59th, and 68th 26 tone RUs and the first to 8th 242 tone RUs correspond to resources that are not allocated to the receiving STA.

The first MRU may include an MRU in which the 5th 26 tone RU and the second 52 tone RU are aggregated, an MRU in which the 14th 26 tone RU and the 6th 52 tone RU are aggregated, an MRU in which the 23rd 26 tone RU and the 10th 52 tone RU are aggregated, an MRU in which the 32nd 26 tone RU and the 14th 52 tone RU are aggregated, an MRU in which the 41st 26 tone RU and the 18th 52 tone RU are aggregated, an MRU in which the 50th 26 tone RU and the 22nd 52 tone RU are aggregated, an MRU in which the 59th 26 tone RU and the 26th 52 tone RU are aggregated, an MRU in which the 68th 26 tone RU and the 30th 52 tone RU are aggregated, an MRU in which the 5th 26 tone RU and the first 106 tone RU are aggregated, an MRU in which the 14th 26 tone RU and the 4th 106 tone RU are aggregated, an MRU in which the 23rd 26 tone RU and the 5th 106 tone RU are aggregated, and an MRU in which the 32nd 26 tone RU and the 8th 106 tone RU are aggregated, an MRU in which the 41st 26 tone RU and the 9th 106 tone RU are aggregated, an MRU in which the 50th 26 tone RU and the 12th 106 tone RU are aggregated, an MRU in which the 59th 26 tone RU and the 13th 106 tone RU are aggregated, and an MRU in which the 68th 26 tone RU and the 16th 106 tone RU are aggregated. That is, the multiple RUs included in the first MRU also correspond to resources that are not allocated to the receiving STA.

Additionally, when the receiving STA that operates only in a 20 MHz band receives an OFDMA PPDU through a 320 MHz band, a method of the receiving STA being allocated only to resource units other than the first RU and the first MRU may be proposed as described below.

When the preset frequency band is a 320 MHz band, a layout (or tone plan) of RUs for the 320 MHz band is as described below. The tone plan for the 320 MHz band that is proposed in the 802.11be WLAN system is the same as a tone plan repeating four times the tone plan for the 80 MHz band that is proposed in the 802.11be WLAN system. The 320 MHz band may include first to 4th 80 MHz subchannels.

When the first 80 MHz subchannel consists of only 26 tone RUs, the first 80 MHz subchannel may include first to 36th 26 tone RUs, when the first 80 MHz subchannel consists of only 52 tone RUs, the first 80 MHz subchannel may include first to 16th 52 tone RUs, when the first 80 MHz subchannel consists of only 106 tone RUs, the first 80 MHz subchannel may include first to 8th 106 tone RUs, and when the first 80 MHz subchannel consists only of 242 tone RUs, the first 80 MHz subchannel may include first to 4th 242 tone RUs.

When the second 80 MHz subchannel consists of only 26 tone RUs, the second 80 MHz subchannel may include 37th to 72nd 26 tone RUs, when the second 80 MHz subchannel consists of only 52 tone RUs, the second 80 MHz subchannel may include 17th to 32nd 52 tone RUs, when the second 80 MHz subchannel consists of only 106 tone RUs, the second 80 MHz subchannel may include 9th to 16th 106 tone RUs, and when the second 80 MHz subchannel consists only of 242 tone RUs, the second 80 MHz subchannel may include 5th to 8th 242 tone RUs.

When the third 80 MHz subchannel consists of only 26 tone RUs, the third 80 MHz subchannel may include 73rd to 108th 26 tone RUs, when the third 80 MHz subchannel consists of only 52 tone RUs, the third 80 MHz subchannel may include 33rd to 48th 52 tone RUs, when the third 80 MHz subchannel consists of only 106 tone RUs, the third 80 MHz subchannel may include 17th to 24th 106 tone RUs, and when the third 80 MHz subchannel consists only of 242 tone RUs, the third 80 MHz subchannel may include 9th to 12th 242 tone RUs.

When the fourth 80 MHz subchannel consists of only 26 tone RUs, the fourth 80 MHz subchannel may include 109th to 144th 26 tone RUs, when the fourth 80 MHz subchannel consists of only 52 tone RUs, the fourth 80 MHz subchannel may include 49th to 64th 52 tone RUs, when the fourth 80 MHz subchannel consists of only 106 tone RUs, the fourth 80 MHz subchannel may include 25th to 32nd 106 tone RUs, and when the fourth 80 MHz subchannel consists only of 242 tone RUs, the fourth 80 MHz subchannel may include 13th to 16th 242 tone RUs.

At this point, the first to 144th 26 tone RUs may be arranged by an order starting from a 26 tone RU having a low frequency to a 26 tone RU having a high frequency, the first to 64th 52 tone RUs may be arranged by an order starting from a 52 tone RU having a low frequency to a 52 tone RU having a high frequency, the first to 32nd 106 tone RUs may be arranged by an order starting from a 106 tone RU having a low frequency to a 106 tone RU having a high frequency, and the first to 16th 242 tone RUs may be arranged by an order starting from a 242 tone RU having a low frequency to a 242 tone RU having a high frequency.

The first RU may include the 5th, 14th, 23rd, 32nd, 41st, 50th, 59th, 68th, 77th, 86th, 95th, 104th, 113th, 122nd, 131st, and 140th, 26 tone RUs and the first to 16th 242 tone RUs.

That is, the 5th, 14th, 23rd, 32nd, 41st, 50th, 59th, 68th, 77th, 86th, 95th, 104th, 113th, 122nd, 131st, and 140th, 26 tone RUs and the first to 16th 242 tone RUs correspond to resources that are not allocated to the receiving STA.

The first MRU may include an MRU in which the 5th 26 tone RU and the second 52 tone RU are aggregated, an MRU in which the 14th 26 tone RU and the 6th 52 tone RU are aggregated, an MRU in which the 23rd 26 tone RU and the 10th 52 tone RU are aggregated, an MRU in which the 32nd 26 tone RU and the 14th 52 tone RU are aggregated, an MRU in which the 41st 26 tone RU and the 18th 52 tone RU are aggregated, an MRU in which the 50th 26 tone RU and the 22nd 52 tone RU are aggregated, an MRU in which the 59th 26 tone RU and the 26th 52 tone RU are aggregated, an MRU in which the 68th 26 tone RU and the 30th 52 tone RU are aggregated, an MRU in which the 77th 26 tone RU and the 34th 52 tone RU are aggregated, an MRU in which the 86th 26 tone RU and the 38th 52 tone RU are aggregated, an MRU in which the 95th 26 tone RU and the 42nd 52 tone RU are aggregated, an MRU in which the 104th 26 tone RU and the 46th 52 tone RU are aggregated, an MRU in which the 113th 26 tone RU and the 50th 52 tone RU are aggregated, an MRU in which the 122nd 26 tone RU and the 54th 52 tone RU are aggregated, an MRU in which the 131st 26 tone RU and the 58th 52 tone RU are aggregated, an MRU in which the 140th 26 tone RU and the 62nd 52 tone RU are aggregated, an MRU in which the 5th 26 tone RU and the first 106 tone RU are aggregated, an MRU in which the 14th 26 tone RU and the 4th 106 tone RU are aggregated, an MRU in which the 23rd 26 tone RU and the 5th 106 tone RU are aggregated, and an MRU in which the 32nd 26 tone RU and the 8th 106 tone RU are aggregated, an MRU in which the 41st 26 tone RU and the 9th 106 tone RU are aggregated, an MRU in which the 50th 26 tone RU and the 12th 106 tone RU are aggregated, an MRU in which the 59th 26 tone RU and the 13th 106 tone RU are aggregated, and an MRU in which the 68th 26 tone RU and the 16th 106 tone RU are aggregated, an MRU in which the 77th 26 tone RU and the 17th 106 tone RU are aggregated, an MRU in which the 86th 26 tone RU and the 20th 106 tone RU are aggregated, an MRU in which the 95th 26 tone RU and the 21st 106 tone RU are aggregated, an MRU in which the 104th 26 tone RU and the 24th 106 tone RU are aggregated, an MRU in which the 113th 26 tone RU and the 25th 106 tone RU are aggregated, an MRU in which the 122nd 26 tone RU and the 28th 106 tone RU are aggregated, an MRU in which the 131st 26 tone RU and the 29th 106 tone RU are aggregated, and an MRU in which the 140th 26 tone RU and the 32nd 106 tone RU are aggregated. That is, the multiple RUs included in the first MRU also correspond to resources that are not allocated to the receiving STA.

The PPDU may be a DL OFDMA PPDU or UL OFDMA PPDU. When the PPDU is a DL OFDMA PPDU, the transmitting STA may transmit an Extremely High Throughput (EHT) Multi User (MU) PPDU to the receiving STA, and the receiving STA may decode the EHT MU PPDU through resources other than the first RU and the first MRU among the preset frequency band. And, when the PPDU is an Uplink (UL) OFDMA PPDU, the transmitting STA is an STA that operates only in a 20 MHz band, and the transmitting STA receives a trigger frame from the receiving STA (herein, the AP). And, the transmitting STA may transmit a Trigger Based (TB) PPDU to the receiving STA. At this point, and the EHT TB PPDU may be transmitted through resources other than the first RU and the first MRU among the preset frequency band. The EHT MU PPDU may include Legacy-Short Training Field (L-STF), Legacy-Long Training Field (L-LTF), Legacy-Signal (L-SIG), Repeated L-SIG (RL-SIG), Universal-Signal (U-SIG), EHT-SIG, EHT-STF, and EHT-LTFs data fields. The EHT TB PPDU is defined as a format excluding the EHT-SIG from the EHT MU PPDU.

Additionally, when the PPDU is a DL OFDMA PPDU, 242 tone RUs that are included in the preset frequency band may be optionally allocated. For example, when the PPDU is a DL OFDMA PPDU that is received through a 40 MHz band, the first RU may optionally include the first and second 242 tone RUs. That is, the transmitting STA may optionally allocate the first and second 242 RU tones to the receiving STA. If the first RU includes only the first 242 tone RU and does not include the second 242 tone RU, the receiving STA may receive the DL OFDMA PPDU through the second 242 tone RU (in case the receiving STA has capability for the second 242 tone RU). This may also be identically applied when the preset frequency band is an 80 MHz, 160 MHz, 320 MHz band.

4. Device Configuration

The above-described technical features of the present specification may be applied to various device and methods. For example, the above-described technical features of the present specification may be performed/supported through FIG. 1 and/or FIG. 11. For example, the above-described technical features of the present specification may be applied to only part of FIG. 1 and/or FIG. 11. For example, the above-described technical features of the present specification may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device of the present specification receives a Physical Protocol Data Unit (PPDU) from a transmitting station (STA) through a preset frequency band, and decodes the PPDU.

The technical features of the present specification may be implemented based on a computer readable medium (CRM). For example, the CRM that is proposed in the present specification is a computer readable medium including an instruction being executed by at least one processor.

The CRM may store instructions performing operations including receiving a Physical Protocol Data Unit (PPDU) from a transmitting station (STA) through a preset frequency band, and decoding the PPDU. The instructions that are stored in the CRM of the present specification may be executed by at least one processor. At least one processor being related to the CRM of the present specification may be the processor(s) 111 and 121 or processing chip(s) 114 and 124 of FIG. 1, or the processor 610 of FIG. 11. Meanwhile, the CRM of the present specification may be the memory(s) 112 and 122 of FIG. 1, or the memory 620 of FIG. 11, or a separate external memory/storage medium/disc, and so on.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method in a wireless local area network (WLAN) system, the method comprising:
   receiving, by a receiving station (STA), a Physical Protocol Data Unit (PPDU) from a transmitting STA; and
   decoding, by the receiving STA, the PPDU,
   wherein the receiving STA is a 20 MHz operating non-AP STA,
   wherein the 20 MHz operating non-AP STA does not support a first multiple-resource unit (MRU),
   wherein, based on a bandwidth of the PPDU being 40 MHz, the bandwidth of the PPDU consists of first to 18th 26 tone RUs, first to 8th 52 tone RUs, first to 4th 106 tone RUs, or first and second 242 tone RUs,
   wherein the first MRU includes a first MRU type and a second MRU type, wherein the first MRU type is a 52+26-tone MRU corresponding to MRU combinations of the 52+26-tone MRU,
wherein the MRU combinations of the 52+26-tone MRU includes an MRU including the second 52 tone RU and the 5th 26 tone RU, and an MRU including the 6th 52 tone RU and the 14th 26 tone RU,
wherein the second MRU type is a 106+26-tone MRU corresponding to MRU combinations of the 106+26-tone MRU, and
wherein the MRU combinations of the 106+26-tone MRU includes an MRU including the first 106 tone RU and 5th 26 tone RU, an MRU including the second 106 tone RU and the 5th 26 tone RU, an MRU including the 3rd 106 tone RU and the 14th 26 tone RU, and an MRU including the 4th 106 tone RU and the 14th 26 tone RU.

2. The method of claim 1, wherein the first to 18th 26 tone RUs are arranged by an order starting from a 26 tone RU having a low frequency to a 26 tone RU having a high frequency,
wherein the first to 8th 52 tone RUs are arranged by an order starting from a 52 tone RU having a low frequency to a 52 tone RU having a high frequency,
wherein the first to 4th 106 tone RUs are arranged by an order starting from a 106 tone RU having a low frequency to a 106 tone RU having a high frequency, and
wherein the first and second 242 tone RUs are arranged by an order starting from a 242 tone RU having a low frequency to a 242 tone RU having a high frequency.

3. The method of claim 1, wherein, based on the bandwidth of the PPDU being 80 MHz consisting of first to 36th 26 tone RUs, first to 16th 52 tone RUs, first to 8th 106 tone RUs, or first to 4th 242 tone RUs,
wherein the MRU combinations of the 52+26-tone MRU includes an MRU including the 5th 26 tone RU and the second 52 tone RU, an MRU including the 14th 26 tone RU and the 6th 52 tone RU, an MRU including the 23rd 26 tone RU and the 10th 52 tone RU, an MRU including the 32nd 26 tone RU and the 14th 52 tone RU,
wherein the MRU combinations of the 106+26-tone MRU includes an MRU including the 5th 26 tone RU and the first 106 tone RU, an MRU including the 14th 26 tone RU and the 4th 106 tone RU, an MRU including the 23rd 26 tone RU and the 5th 106 tone RU, and an MRU including the 32nd 26 tone RU and the 8th 106 tone RU.

4. The method of claim 3, wherein the first to 36th 26 tone RUs are arranged by an order starting from a 26 tone RU having a low frequency to a 26 tone RU having a high frequency,
wherein the first to 16th 52 tone RUs are arranged by an order starting from a 52 tone RU having a low frequency to a 52 tone RU having a high frequency,
wherein the first to 8th 106 tone RUs are arranged by an order starting from a 106 tone RU having a low frequency to a 106 tone RU having a high frequency, and
wherein the first to 4th 242 tone RUs are arranged by an order starting from a 242 tone RU having a low frequency to a 242 tone RU having a high frequency.

5. The method of claim 1, wherein, based on the bandwidth of the PPDU being 160 MHz including first and second 80 MHz subchannels,
wherein the first 80 MHz subchannel includes first to 36th 26 tone RUs, first to 16th 52 tone RUs, first to 8th 106 tone RUs, or first to 4th 242 tone RUs, and
when the second 80 MHz subchannel includes 37th to 72nd 26 tone RUs, 17th to 32nd 52 tone RUs, 9th to 16th 106 tone RUs, or 5th to 8th 242 tone RUs.

6. The method of claim 5,
wherein the MRU combinations of the 52+26-tone MRU includes:
an MRU including the 5th 26 tone RU and the second 52 tone RU, an MRU including the 14th 26 tone RU and the 6th 52 tone RU, an MRU including the 23rd 26 tone RU and the 10th 52 tone RU, an MRU including the 32nd 26 tone RU and the 14th 52 tone RU,
an MRU including the 41st 26 tone RU and the 18th 52 tone, an MRU including the 50th 26 tone RU and the 22nd 52 tone RU, an MRU including the 59th 26 tone RU and the 26th 52 tone RU, an MRU including the 68th 26 tone RU and the 30th 52 tone RU,
wherein the MRU combinations of the 106+26-tone MRU includes:
an MRU including the 5th 26 tone RU and the first 106 tone RU, an MRU including the 14th 26 tone RU and the 4th 106 tone RU, an MRU including the 23rd 26 tone RU and the 5th 106 tone RU, and an MRU including the 32nd 26 tone RU and the 8th 106 tone RU,
an MRU including the 41st 26 tone RU and the 9th 106 tone RU, an MRU including the 50th 26 tone RU and the 12th 106 tone RU, an MRU including the 59th 26 tone RU and the 13th 106 tone RU, and an MRU including the 68th 26 tone RU and the 16th 106 tone RU.

7. The method of claim 6, wherein the first to 72nd 26 tone RUs are arranged by an order starting from a 26 tone RU having a low frequency to a 26 tone RU having a high frequency,
wherein the first to 36th 52 tone RUs are arranged by an order starting from a 52 tone RU having a low frequency to a 52 tone RU having a high frequency,
wherein the first to 16th 106 tone RUs are arranged by an order starting from a 106 tone RU having a low frequency to a 106 tone RU having a high frequency, and
wherein the first to 8th 242 tone RUs are arranged by an order starting from a 242 tone RU having a low frequency to a 242 tone RU having a high frequency.

8. The method of claim 1, wherein, based on the bandwidth of the PPDU being 320 MHz including first to 4th 80 MHz subchannels,
wherein the first 80 MHz subchannel includes first to 36th 26 tone RUs, first to 16th 52 tone RUs, first to 8th 106 tone RUs, or first to 4th 242 tone RUs,
when the second 80 MHz subchannel includes 37th to 72nd 26 tone RUs, 17th to 32nd 52 tone RUs, 9th to 16th 106 tone RUs, or 5th to 8th 242 tone RUs,
when the third 80 MHz subchannel includes 73rd to 108th 26 tone RUs, 33rd to 48th 52 tone RUs, 17th to 24th 106 tone RUs, or 9th to 12th 242 tone RUs, and
when the fourth 80 MHz subchannel includes 109th to 144th 26 tone RUs, 49th to 64th 52 tone RUs, 25th to 32nd 106 tone RUs, or 13th to 16th 242 tone RUs.

9. The method of claim 8,
wherein the MRU combinations of the 52+26-tone MRU includes:
an MRU including the 5th 26 tone RU and the second 52 tone RU, an MRU including the 14th 26 tone RU and the 6th 52 tone RU, an MRU including the 23rd 26 tone RU and the 10th 52 tone RU, an MRU including the 32nd 26 tone RU and the 14th 52 tone RU, an MRU including the 41st 26 tone RU and the 18th 52 tone RU, an MRU including the 50th 26 tone RU and the 22nd 52 tone RU, an MRU including the 59th 26 tone RU and the 26th 52 tone RU, an MRU including the 68th 26 tone RU and the 30th 52 tone RU, an MRU including the 77th 26 tone RU and the 34th 52 tone RU, an MRU including the 86th 26 tone RU and the 38th 52 tone RU, an MRU including the 95th 26 tone RU and the 42nd 52 tone RU, an MRU including the 104th 26 tone RU and the 46th 52 tone RU, an MRU including the 113th 26 tone RU and the 50th 52 tone RU, an MRU including the 122nd 26 tone RU and the 54th 52 tone RU, an MRU including the 131st 26 tone RU and the 58th 52 tone RU, an MRU including the 140th 26 tone RU and the 62nd 52 tone RU, wherein the MRU combinations of the 106+26-tone MRU includes:

an MRU including the 5th 26 tone RU and the first 106 tone RU, an MRU including the 14th 26 tone RU and the 4th 106 tone RU, an MRU including the 23rd 26 tone RU and the 5th 106 tone RU, and an MRU including the 32nd 26 tone RU and the 8th 106 tone RU, an MRU including the 41st 26 tone RU and the 9th 106 tone RU, an MRU including the 50th 26 tone RU and the 12th 106 tone RU, an MRU including the 59th 26 tone RU and the 13th 106 tone RU, and an MRU including the 68th 26 tone RU and the 16th 106 tone RU, an MRU including the 77th 26 tone RU and the 17th 106 tone RU, an MRU including the 86th 26 tone RU and the 20th 106 tone RU, an MRU including the 95th 26 tone RU and the 21st 106 tone RU, an MRU including the 104th 26 tone RU and the 24th 106 tone RU, an MRU including the 113th 26 tone RU and the 25th 106 tone RU, an MRU including the 122nd 26 tone RU and the 28th 106 tone RU, an MRU including the 131st 26 tone RU and the 29th 106 tone RU, and an MRU including the 140th 26 tone RU and the 32nd 106 tone RU.

10. The method of claim 9, wherein the first to 144th 26 tone RUs are arranged by an order starting from a 26 tone RU having a low frequency to a 26 tone RU having a high frequency, wherein the first to 64th 52 tone RUs are arranged by an order starting from a 52 tone RU having a low frequency to a 52 tone RU having a high frequency, wherein the first to 32nd 106 tone RUs are arranged by an order starting from a 106 tone RU having a low frequency to a 106 tone RU having a high frequency, and wherein the first to 16th 242 tone RUs are arranged by an order starting from a 242 tone RU having a low frequency to a 242 tone RU having a high frequency.

11. The method of claim 1, wherein, when the PPDU is a Downlink (DL) Orthogonal Frequency Division Multiple Access (OFDMA) PPDU, the PPDU is an Extremely High Throughput (EHT) Multi User (MU) PPDU, and the EHT MU PPDU is decoded by the receiving STA through resources other than the first MRU, and wherein, when the PPDU is an Uplink (UL) OFDMA PPDU, the PPDU is a Trigger Based (TB) PPDU, and the EHT TB PPDU is transmitted by the transmitting STA through resources other than the first MRU.

12. A receiving station (STA) in a wireless local area network (WLAN) system, the receiving STA comprising:
 a memory;
 a transceiver; and
 a processor being operatively connected to the memory and the transceiver,
 wherein the processor is configured to:
 receive a Physical Protocol Data Unit (PPDU) from a transmitting STA, and
 decode the PPDU,
 wherein the receiving STA is a 20 MHz operating non-AP STA,
 wherein the 20 MHz operating non-AP STA does not support a first multiple-resource unit (MRU),
 wherein, based on a bandwidth of the PPDU being 40 MHz, the bandwidth of the PPDU consists of first to 18th 26 tone RUs, first to 8th 52 tone RUs, first to 4th 106 tone RUs, or first and second 242 tone RUs,
 wherein the first MRU includes a first MRU type and a second MRU type,
 wherein the first MRU type is a 52+26-tone MRU corresponding to MRU combinations of the 52+26-tone MRU,
 wherein the MRU combinations of the 52+26-tone MRU includes an MRU including the second 52 tone RU and the 5th 26 tone RU, and an MRU including the 6th 52 tone RU and the 14th 26 tone RU,
 wherein the second MRU type is a 106+26-tone MRU corresponding to MRU combinations of the 106+26-tone MRU, and
 wherein the MRU combinations of the 106+26-tone MRU includes an MRU including the first 106 tone RU and 5th 26 tone RU, an MRU including the second 106 tone RU and the 5th 26 tone RU, an MRU including the 3rd 106 tone RU and the 14th 26 tone RU, and an MRU including the 4th 106 tone RU and the 14th 26 tone RU.

13. A method in a wireless local area network (WLAN) system, the method comprising:
 generating, by a transmitting station (STA), a Physical Protocol Data Unit (PPDU); and
 transmitting, by the transmitting STA, the PPDU to a receiving STA,
 wherein the receiving STA is a 20 MHz operating non-AP STA,
 wherein the 20 MHz operating non-AP STA does not support a first multiple-resource unit (MRU),
 wherein, based on a bandwidth of the PPDU being 40 MHz, the bandwidth of the PPDU consists of first to 18th 26 tone RUs, first to 8th 52 tone RUs, first to 4th 106 tone RUs, or first and second 242 tone RUs,
 wherein the first MRU includes a first MRU type and a second MRU type,
 wherein the first MRU type is a 52+26-tone MRU corresponding to MRU combinations of the 52+26-tone MRU,
 wherein the MRU combinations of the 52+26-tone MRU includes an MRU including the second 52 tone RU and the 5th 26 tone RU, and an MRU including the 6th 52 tone RU and the 14th 26 tone RU,
 wherein the second MRU type is a 106+26-tone MRU corresponding to MRU combinations of the 106+26-tone MRU, and
 wherein the MRU combinations of the 106+26-tone MRU includes an MRU including the first 106 tone RU and 5th 26 tone RU, an MRU including the second 106 tone RU and the 5th 26 tone RU, an MRU including the 3rd 106 tone RU and the 14th 26 tone RU, and an MRU including the 4th 106 tone RU and the 14th 26 tone RU.

14. The method of claim 13, wherein the first to 18th 26 tone RUs are arranged by an order starting from a 26 tone RU having a low frequency to a 26 tone RU having a high frequency,
wherein the first to 8th 52 tone RUs are arranged by an order starting from a 52 tone RU having a low frequency to a 52 tone RU having a high frequency,
wherein the first to 4th 106 tone RUs are arranged by an order starting from a 106 tone RU having a low frequency to a 106 tone RU having a high frequency, and
wherein the first and second 242 tone RUs are arranged by an order starting from a 242 tone RU having a low frequency to a 242 tone RU having a high frequency.

15. The method of claim 13, wherein, based on the bandwidth of the PPDU being 80 MHz consisting of first to 36th 26 tone RUs, first to 16th 52 tone RUs, first to 8th 106 tone RUs, or first to 4th 242 tone RUs,
wherein the MRU combinations of the 52+26-tone MRU includes an MRU including the 5th 26 tone RU and the second 52 tone RU, an MRU including the 14th 26 tone RU and the 6th 52 tone RU, an MRU including the 23rd 26 tone RU and the 10th 52 tone RU, an MRU including the 32nd 26 tone RU and the 14th 52 tone RU,
wherein the MRU combinations of the 106+26-tone MRU includes an MRU including the 5th 26 tone RU and the first 106 tone RU, an MRU including the 14th 26 tone RU and the 4th 106 tone RU, an MRU including the 23rd 26 tone RU and the 5th 106 tone RU, and an MRU including the 32nd 26 tone RU and the 8th 106 tone RU.

16. The method of claim 15, wherein the first to 36th 26 tone RUs are arranged by an order starting from a 26 tone RU having a low frequency to a 26 tone RU having a high frequency,
wherein the first to 16th 52 tone RUs are arranged by an order starting from a 52 tone RU having a low frequency to a 52 tone RU having a high frequency,
wherein the first to 8th 106 tone RUs are arranged by an order starting from a 106 tone RU having a low frequency to a 106 tone RU having a high frequency, and
wherein the first to 4th 242 tone RUs are arranged by an order starting from a 242 tone RU having a low frequency to a 242 tone RU having a high frequency.

17. The method of claim 13, wherein, based on the bandwidth of the PPDU being 160 MHz including first and second 80 MHz subchannels,
wherein the first 80 MHz subchannel includes first to 36th 26 tone RUs, first to 16th 52 tone RUs, first to 8th 106 tone RUs, or first to 4th 242 tone RUs, and
when the second 80 MHz subchannel includes 37th to 72nd 26 tone RUs, 17th to 32nd 52 tone RUs, 9th to 16th 106 tone RUs, or 5th to 8th 242 tone RUs.

18. The method of claim 17,
wherein the MRU combinations of the 52+26-tone MRU includes:
an MRU including the 5th 26 tone RU and the second 52 tone RU, an MRU including the 14th 26 tone RU and the 6th 52 tone RU, an MRU including the 23rd 26 tone RU and the 10th 52 tone RU, an MRU including the 32nd 26 tone RU and the 14th 52 tone RU,
an MRU including the 41st 26 tone RU and the 18th 52 tone, an MRU including the 50th 26 tone RU and the 22nd 52 tone RU, an MRU including the 59th 26 tone RU and the 26th 52 tone RU, an MRU including the 68th 26 tone RU and the 30th 52 tone RU,
wherein the MRU combinations of the 106+26-tone MRU includes:
an MRU including the 5th 26 tone RU and the first 106 tone RU, an MRU including the 14th 26 tone RU and the 4th 106 tone RU, an MRU including the 23rd 26 tone RU and the 5th 106 tone RU, and an MRU including the 32nd 26 tone RU and the 8th 106 tone RU,
an MRU including the 41st 26 tone RU and the 9th 106 tone RU, an MRU including the 50th 26 tone RU and the 12th 106 tone RU, an MRU including the 59th 26 tone RU and the 13th 106 tone RU, and an MRU including the 68th 26 tone RU and the 16th 106 tone RU.

19. A transmitting station (STA) in a wireless local area network (WLAN) system, the transmitting STA comprising:
a memory;
a transceiver; and
a processor being operatively connected to the memory and the transceiver,
wherein the processor is configured to:
generate a Physical Protocol Data Unit (PPDU); and
transmit the PPDU to a receiving STA,
wherein the receiving STA is a 20 MHz operating non-AP STA,
wherein the 20 MHz operating non-AP STA does not support a first multiple-resource unit (MRU),
wherein, based on a bandwidth of the PPDU being 40 MHz, the bandwidth of the PPDU consists of first to 18th 26 tone RUs, first to 8th 52 tone RUs, first to 4th 106 tone RUs, or first and second 242 tone RUs,
wherein the first MRU includes a first MRU type and a second MRU type,
wherein the first MRU type is a 52+26-tone MRU corresponding to MRU combinations of the 52+26-tone MRU,
wherein the MRU combinations of the 52+26-tone MRU includes an MRU including the second 52 tone RU and the 5th 26 tone RU, and an MRU including the 6th 52 tone RU and the 14th 26 tone RU,
wherein the second MRU type is a 106+26-tone MRU corresponding to MRU combinations of the 106+26-tone MRU, and
wherein the MRU combinations of the 106+26-tone MRU includes an MRU including the first 106 tone RU and 5th 26 tone RU, an MRU including the second 106 tone RU and the 5th 26 tone RU, an MRU including the 3rd 106 tone RU and the 14th 26 tone RU, and an MRU including the 4th 106 tone RU and the 14th 26 tone RU.

* * * * *